United States Patent
Oshima et al.

(10) Patent No.: US 11,017,527 B2
(45) Date of Patent: May 25, 2021

(54) INFORMATION PROCESSING DEVICE, INFORMATION PROCESSING METHOD, AND INFORMATION PROCESSING SYSTEM

(71) Applicant: Sony Corporation, Tokyo (JP)

(72) Inventors: Shiori Oshima, Kanagawa (JP); Kazuhiro Nakagawa, Saitama (JP); Rei Murata, Kanagawa (JP); Eriko Matsui, Tokyo (JP)

(73) Assignee: Sony Corporation, Tokyo (JP)

( * ) Notice: Subject to any disclaimer, the term of this patent is extended or adjusted under 35 U.S.C. 154(b) by 2 days.

(21) Appl. No.: 16/315,323

(22) PCT Filed: Jul. 4, 2017

(86) PCT No.: PCT/JP2017/024515
§ 371 (c)(1),
(2) Date: Jan. 4, 2019

(87) PCT Pub. No.: WO2018/012353
PCT Pub. Date: Jan. 18, 2018

(65) Prior Publication Data
US 2019/0259155 A1     Aug. 22, 2019

(30) Foreign Application Priority Data

Jul. 13, 2016 (JP) .............................. JP2016-138937
Oct. 27, 2016 (JP) ................................ 2016-210217

(51) Int. Cl.
*G06T 7/00*       (2017.01)
*G06T 7/246*      (2017.01)
(Continued)

(52) U.S. Cl.
CPC ........ *G06T 7/0012* (2013.01); *G06K 9/00147* (2013.01); *G06K 9/3233* (2013.01);
(Continued)

(58) Field of Classification Search
CPC ..... G06T 7/0012; G06T 7/246; G06T 7/0016; G06T 2207/30024; G06T 2207/30044; G06K 9/00147; G06K 9/3233
(Continued)

(56) References Cited

U.S. PATENT DOCUMENTS 8,951,184 B2   2/2015   Wong et al.
9,001,884 B2   4/2015   Garakani et al.
(Continued)

FOREIGN PATENT DOCUMENTS

EP      1 267 305 A1    12/2002
GB      2524082 A        9/2015
(Continued)

OTHER PUBLICATIONS

Rad et al., Automatic cleavage detection in H. 264 sequence of human embryo development, May 2016, IEEE (Year: 2016).*
(Continued)

*Primary Examiner* — Wednel Cadeau
(74) *Attorney, Agent, or Firm* — Wolf, Greenfield & Sacks, P.C.

(57) ABSTRACT

There is provided an information processing device including: an analysis unit that specifies a movement in a region-of-interest relating to an embryo on a plurality of images using the plurality of images including the embryo captured in a time series manner during periods corresponding to a plurality of cell stages; a feature value calculation unit that calculates a movement feature value relating to an inside of the embryo on the basis of the specified movement; and a presentation control unit that controls a presentation of the movement feature values acquired during periods corresponding to at least two cell stages among the plurality of cell stages in order to evaluate a quality of the embryo.

20 Claims, 24 Drawing Sheets

(51) Int. Cl.
*G06K 9/32* (2006.01)
*G06K 9/00* (2006.01)
(52) U.S. Cl.
CPC ............ *G06T 7/0016* (2013.01); *G06T 7/246* (2017.01); *G06T 2207/30024* (2013.01); *G06T 2207/30044* (2013.01)
(58) Field of Classification Search
USPC ........................................................ 382/133
See application file for complete search history.

(56) References Cited

U.S. PATENT DOCUMENTS

| | | | |
|---|---|---|---|
| 10,783,638 | B2 | 9/2020 | Akama et al. |
| 2003/0185450 | A1 | 10/2003 | Garakani et al. |
| 2013/0165745 | A1 | 6/2013 | Wong et al. |
| 2013/0225431 | A1 | 8/2013 | Chavez et al. |
| 2014/0063225 | A1 | 3/2014 | Kang et al. |
| 2014/0206931 | A1* | 7/2014 | Zernicka-Goetz ......................... G01N 33/4833 600/34 |
| 2014/0349334 | A1 | 11/2014 | Chavez et al. |
| 2015/0079621 | A1 | 3/2015 | An et al. |
| 2018/0330510 | A1 | 11/2018 | Watanabe |
| 2019/0272641 | A1 | 9/2019 | Akama et al. |
| 2020/0364869 | A1 | 11/2020 | Akama et al. |

FOREIGN PATENT DOCUMENTS

| | | |
|---|---|---|
| JP | 2009-044974 A | 3/2009 |
| JP | 2009-512037 A | 3/2009 |
| JP | 2010-181402 A | 8/2010 |
| JP | 2011-192109 A | 9/2011 |
| JP | 2013-198817 A | 10/2013 |
| JP | 2014-089193 A | 5/2014 |
| JP | 2014-520522 A | 8/2014 |
| JP | 2015-197738 A | 11/2015 |
| JP | 2015-203920 A | 11/2015 |
| WO | WO 03/077552 A1 | 9/2003 |
| WO | WO 2007/042044 A1 | 4/2007 |
| WO | WO 2011/025736 A1 | 3/2011 |
| WO | WO 2013/005012 A1 | 1/2013 |

OTHER PUBLICATIONS

U.S. Appl. No. 16/320,246, filed Jan. 24, 2019, Akama et al.
International Search Report and Written Opinion dated Nov. 8, 2017 in connection with International Application No. PCT/JP2017/027435.
International Preliminary Report on Patentability dated Feb. 14, 2019 in connection with International Application No. PCT/JP2017/027435.
Germain et al., Characterization of cell deformation and migration using a parametric estimation of image motion. IEEE Transactions on Biomedical Engineering. May 1999; vol. 46(5), pp. 584-599.
[No Author Listed], How the Eeva System Works. Oct. 31, 2014. YouTube video. Retrieved from https://www.youtube.com/watch?v=TJ65a3Lzmy8 (.mp4 file; DVD enclosed).
International Search Report and Written Opinion dated Oct. 10, 2017 in connection with International Application No. PCT/JP2017/024515.
International Preliminary Report on Patentability dated Jan. 24, 2019 in connection with International Application No. PCT/JP2017/024515.
Rad et al., Automatic cleavage detection in H.264 sequence of human embryo development, 2016 IEEE Canadian Conference on Electrical and Computer Engineering (CCECE), May 15, 2016, pp. 1-4.
European Communication pursuant to Article 94(3) dated Apr. 23, 2020 in connection with European Application No. 17 761 335.3.
Japanese Office Action dated May 12, 2020 in connection with Japanese Application No. 2016- 151178, and English translation thereof.

* cited by examiner

[Fig. 1]
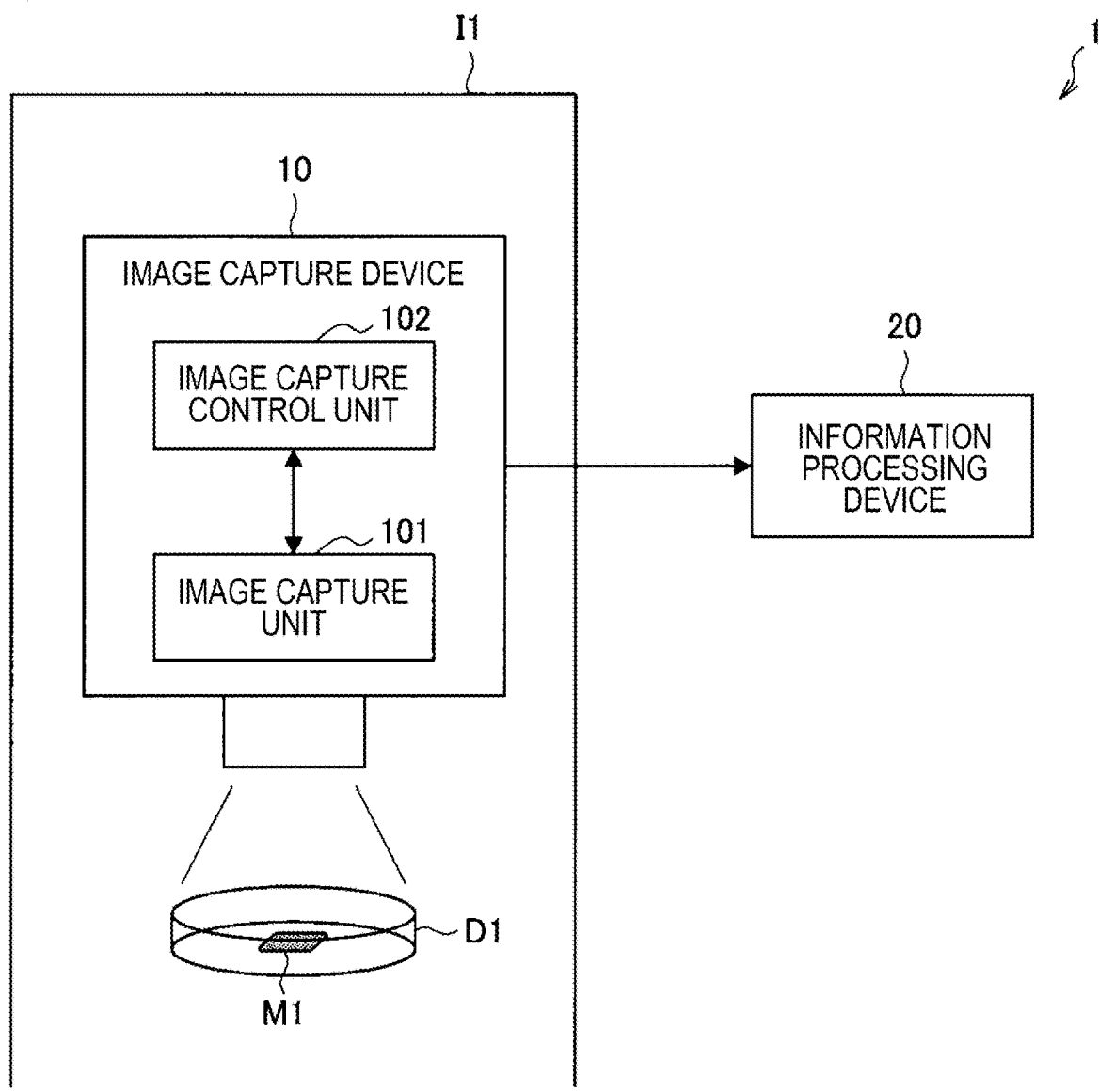

[Fig. 2]
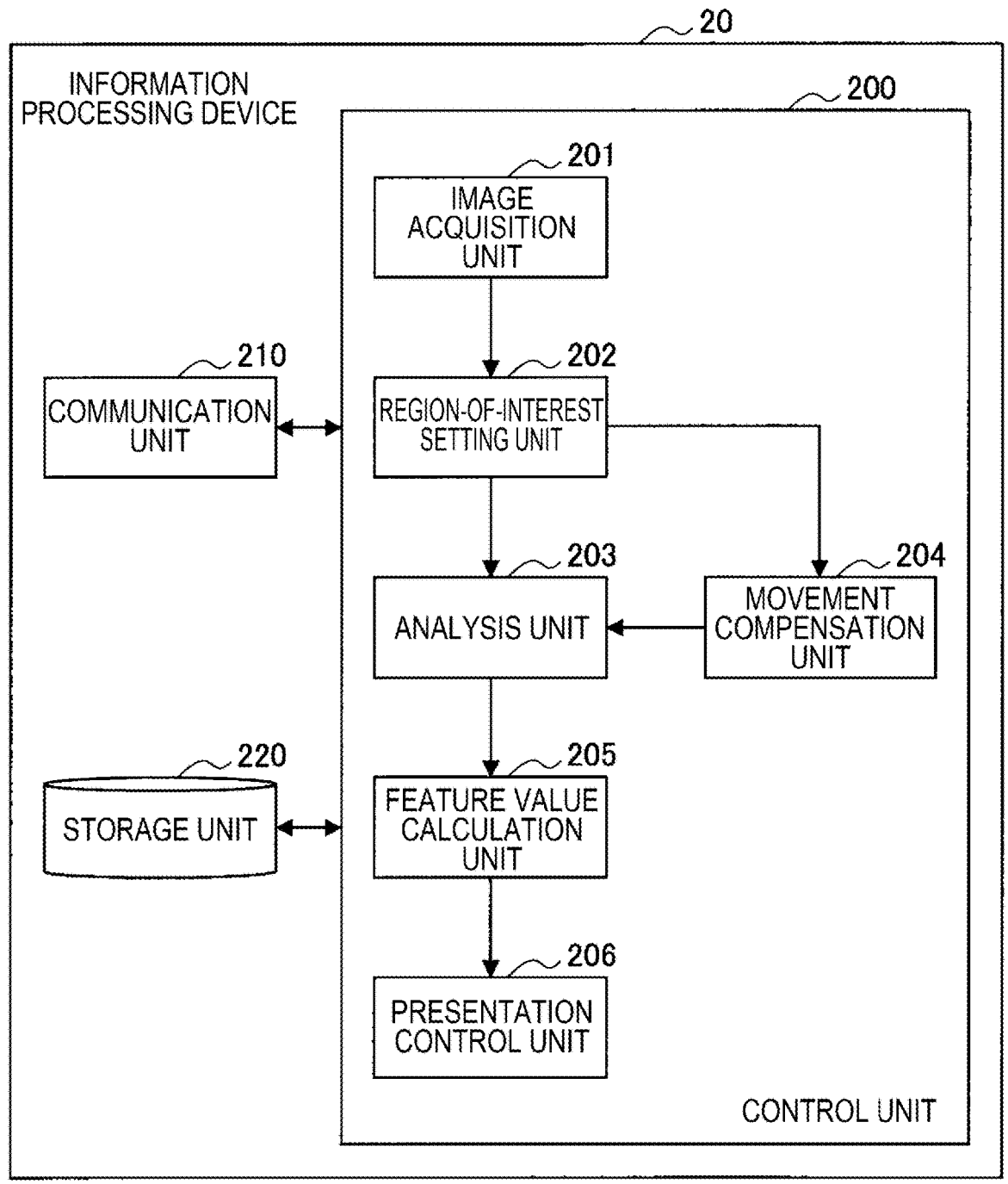

[Fig. 3]
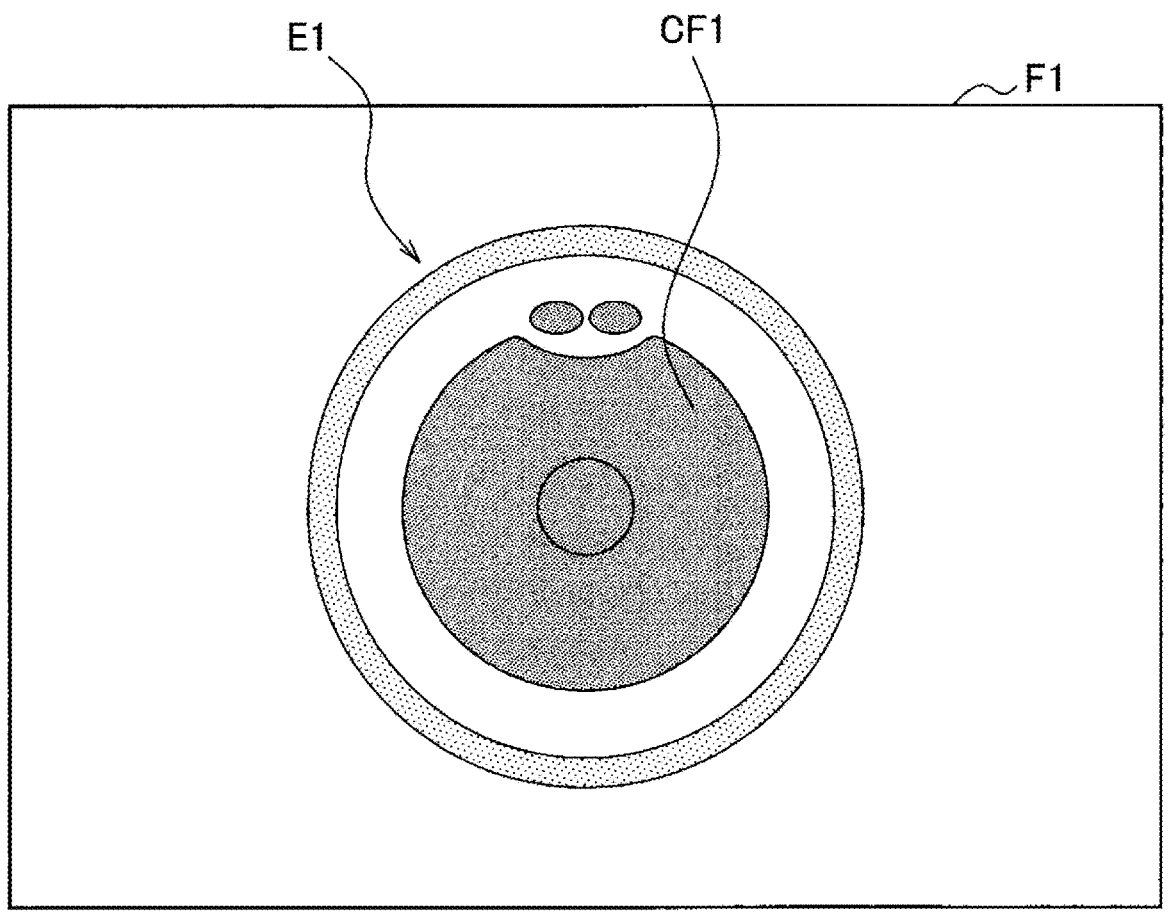

[Fig. 4]
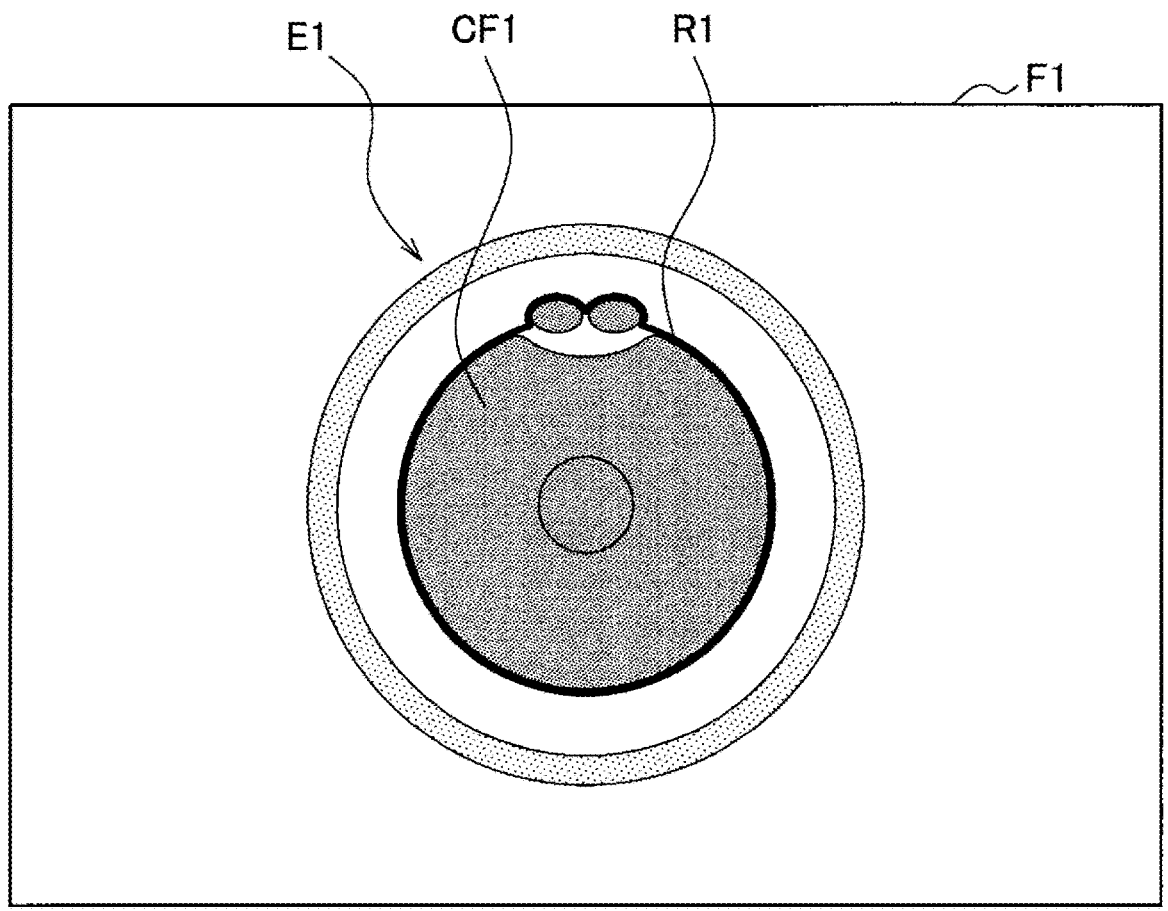

[Fig. 5]
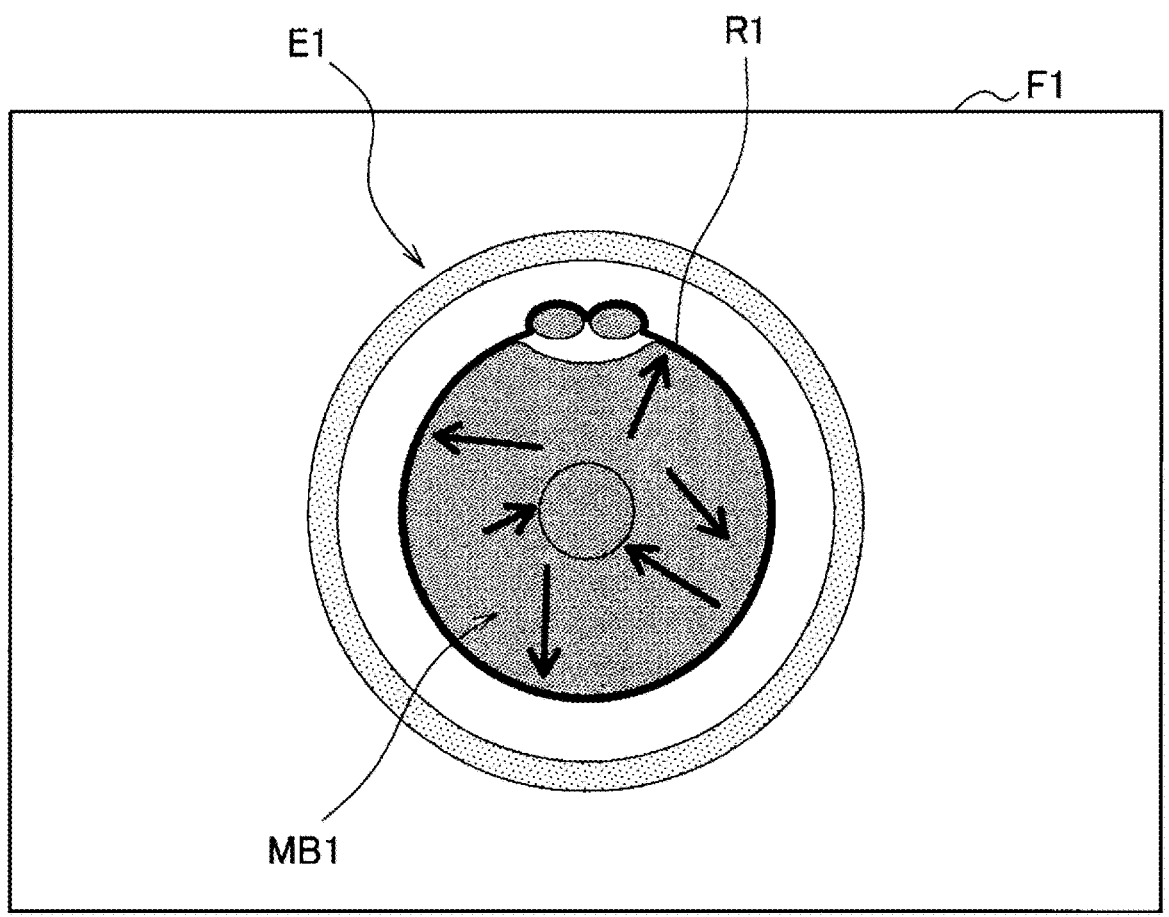

[Fig. 6]
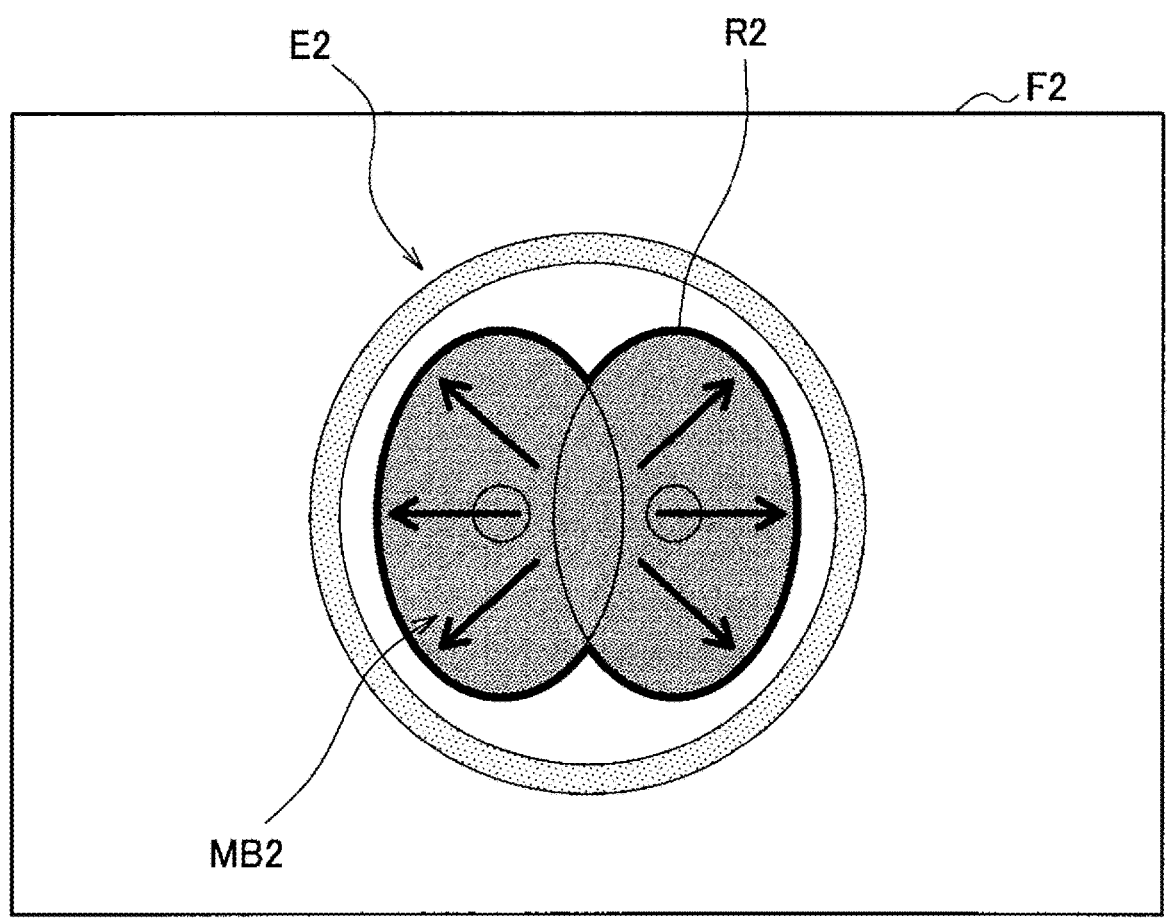

[Fig. 7]
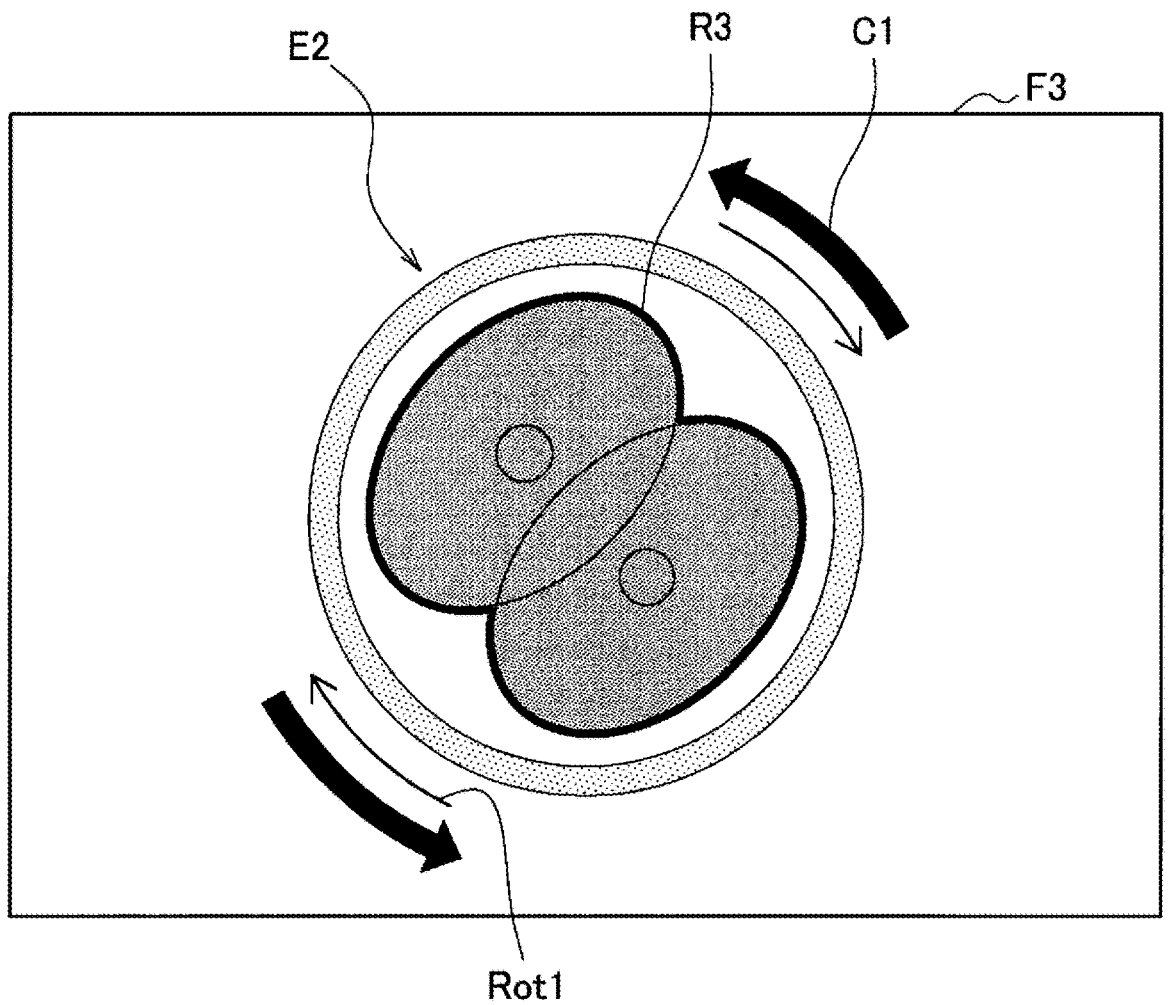

[Fig. 8]
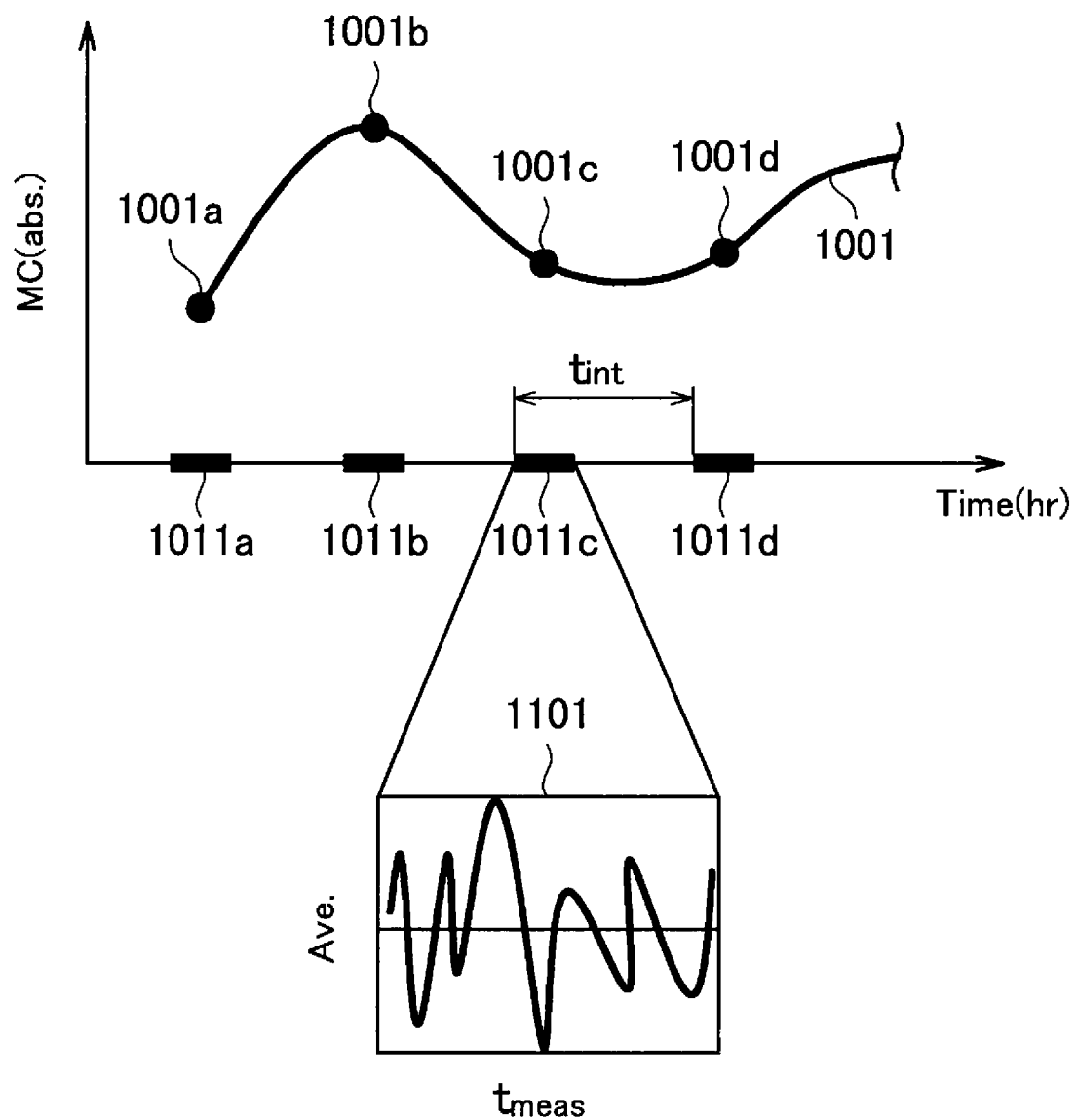

[Fig. 9]
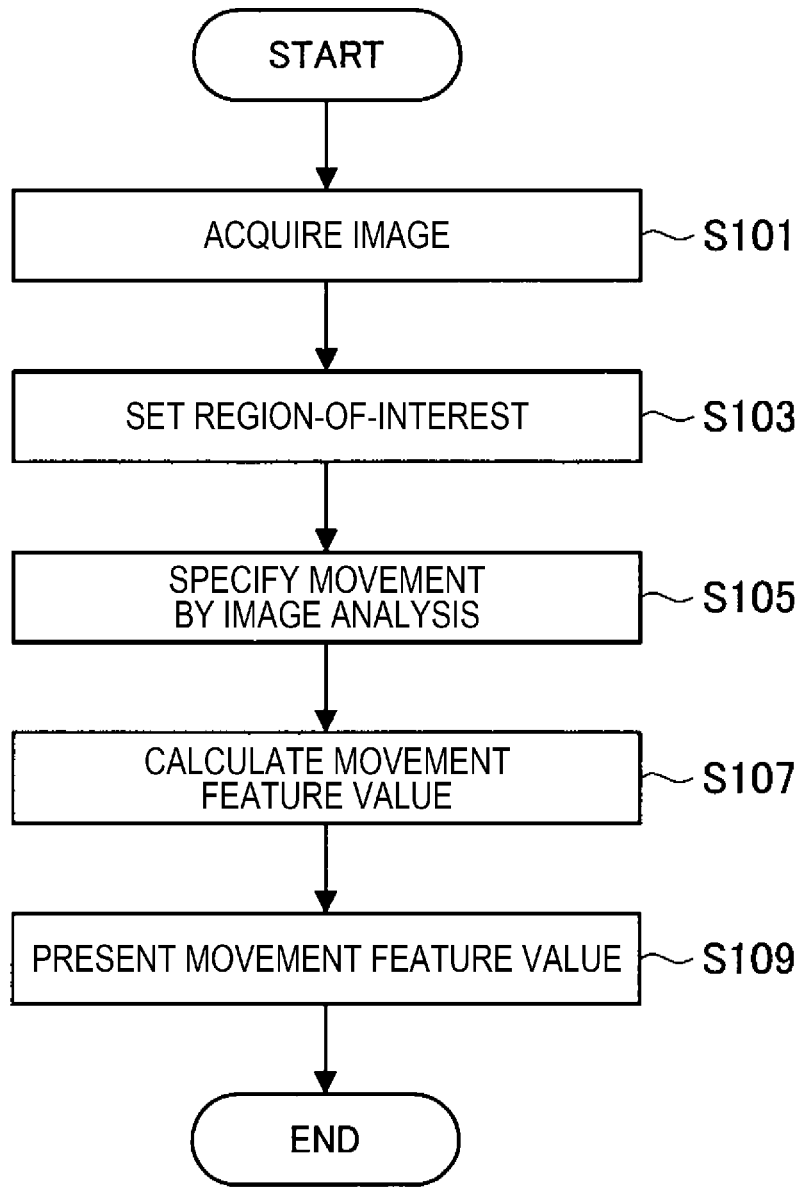

[Fig. 10]
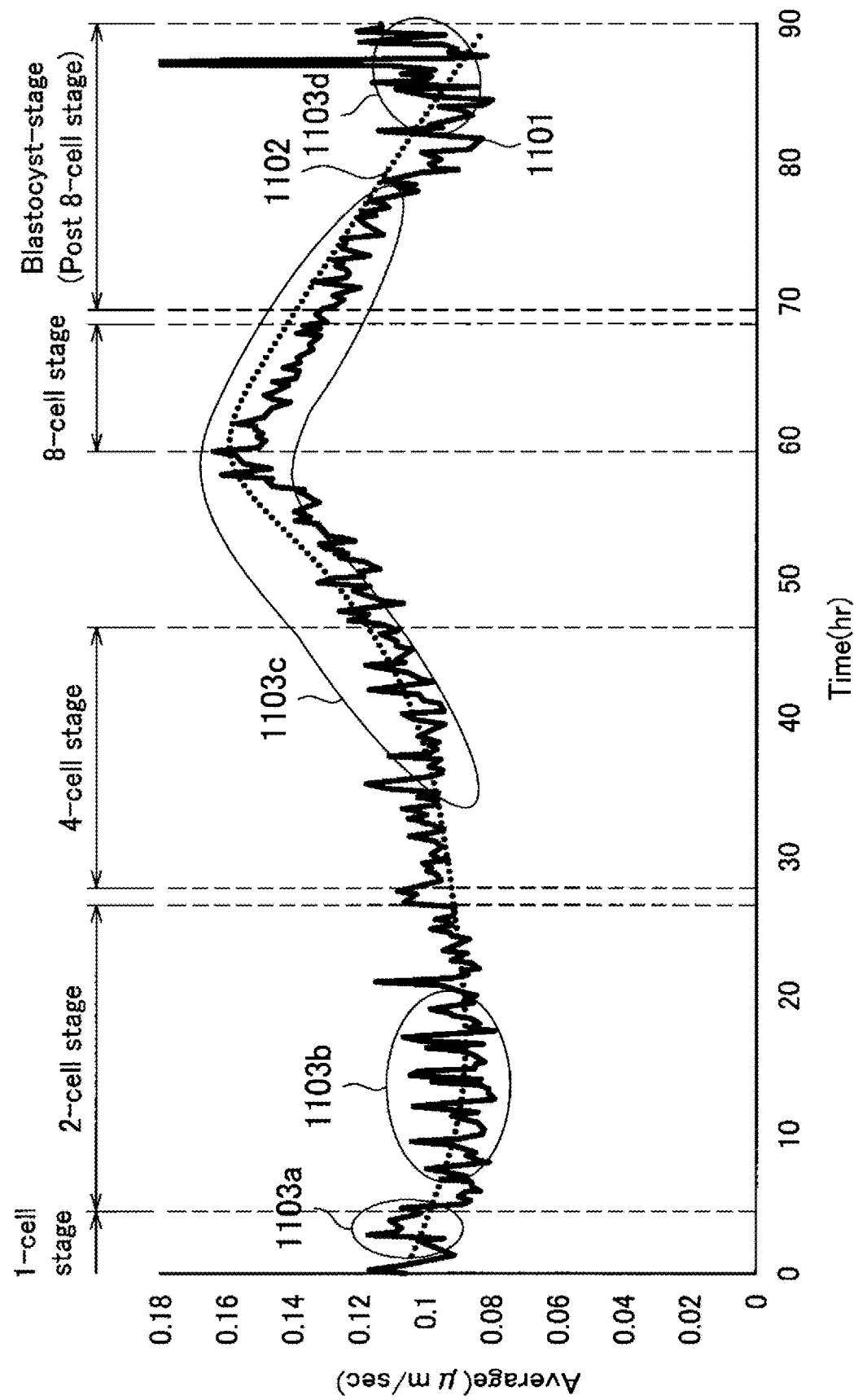

[Fig. 11]
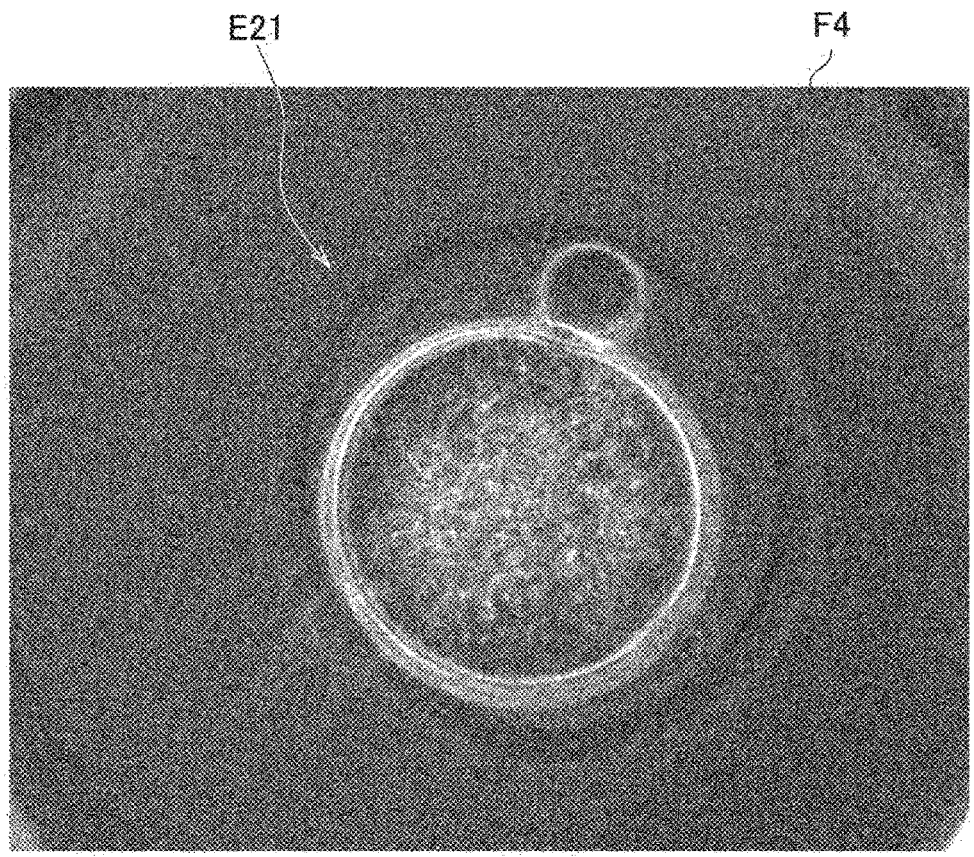
[Fig. 12]
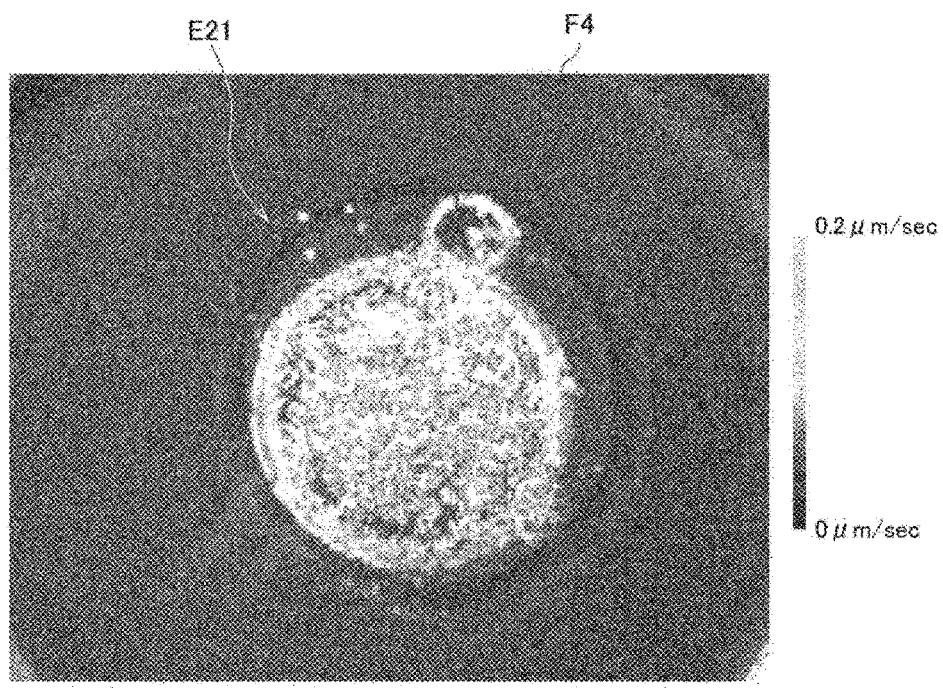

[Fig. 13]
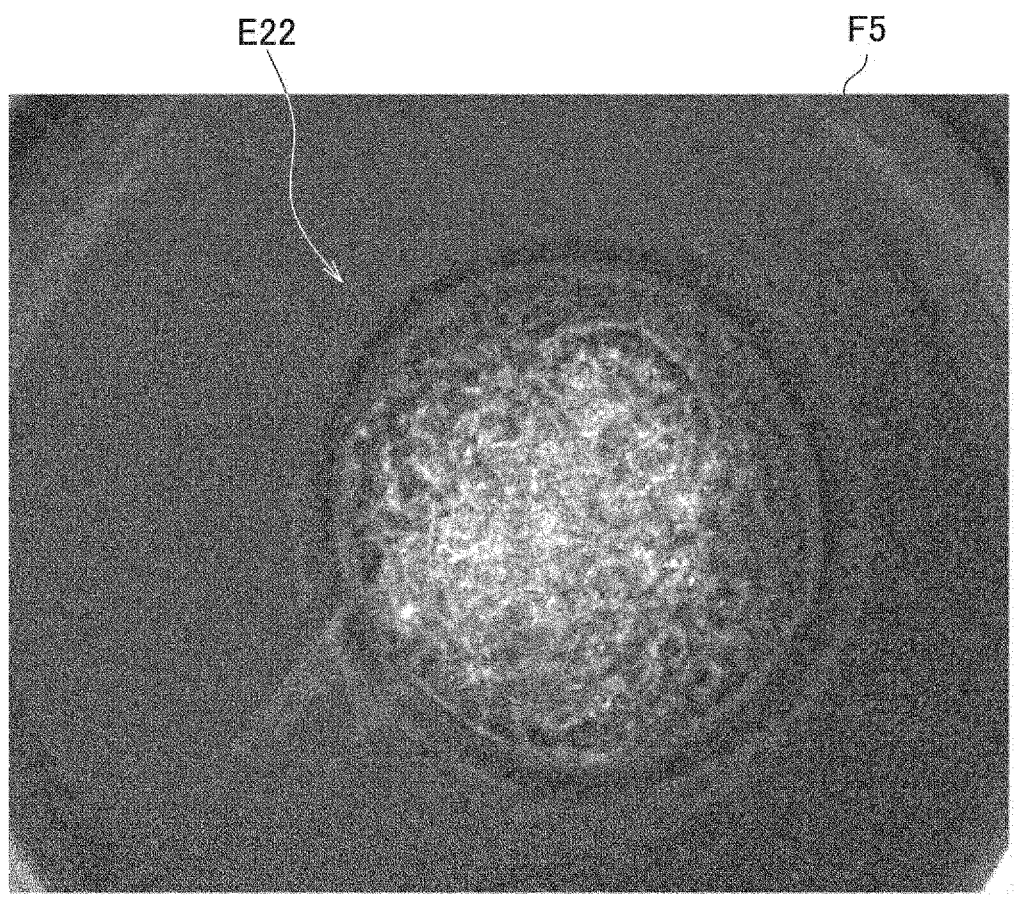

[Fig. 14]
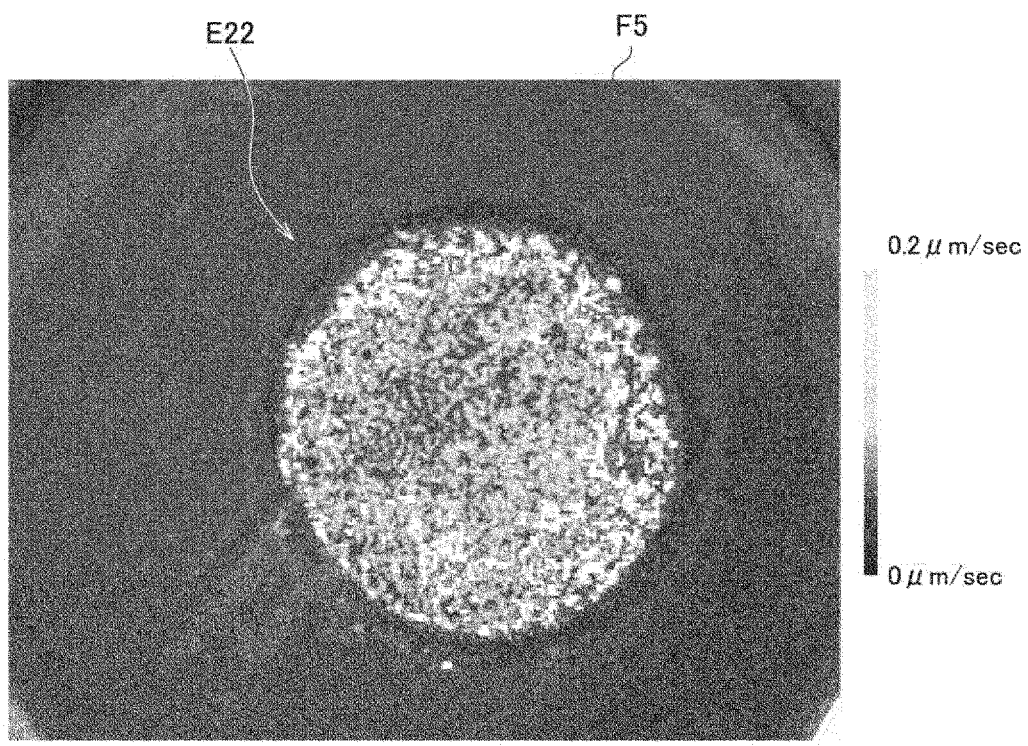

[Fig. 15]
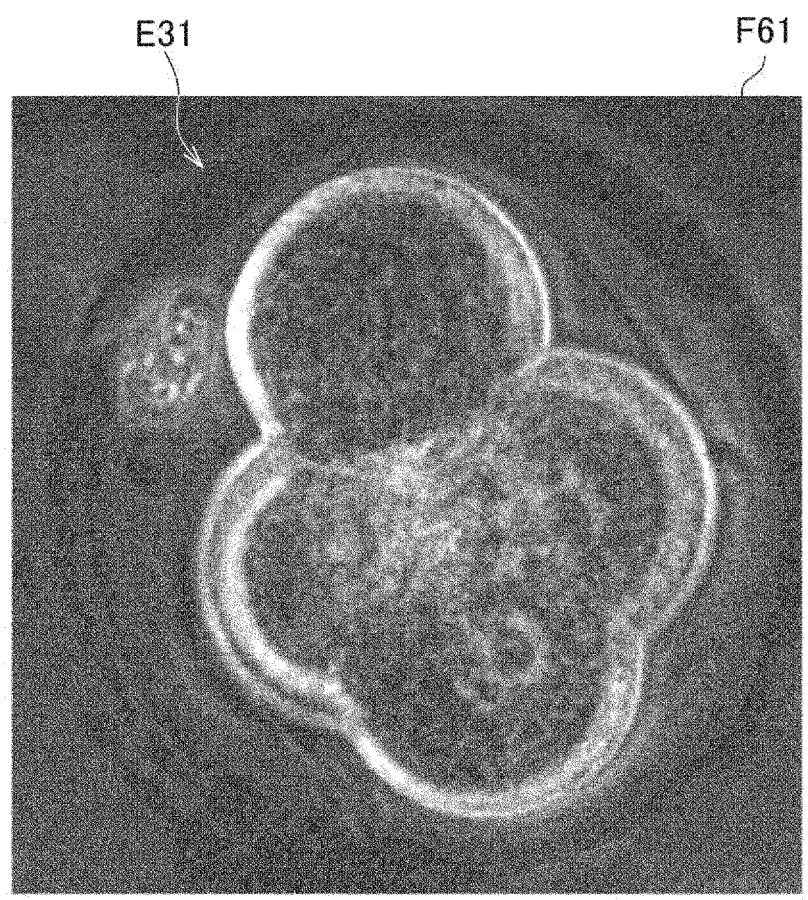

[Fig. 16]
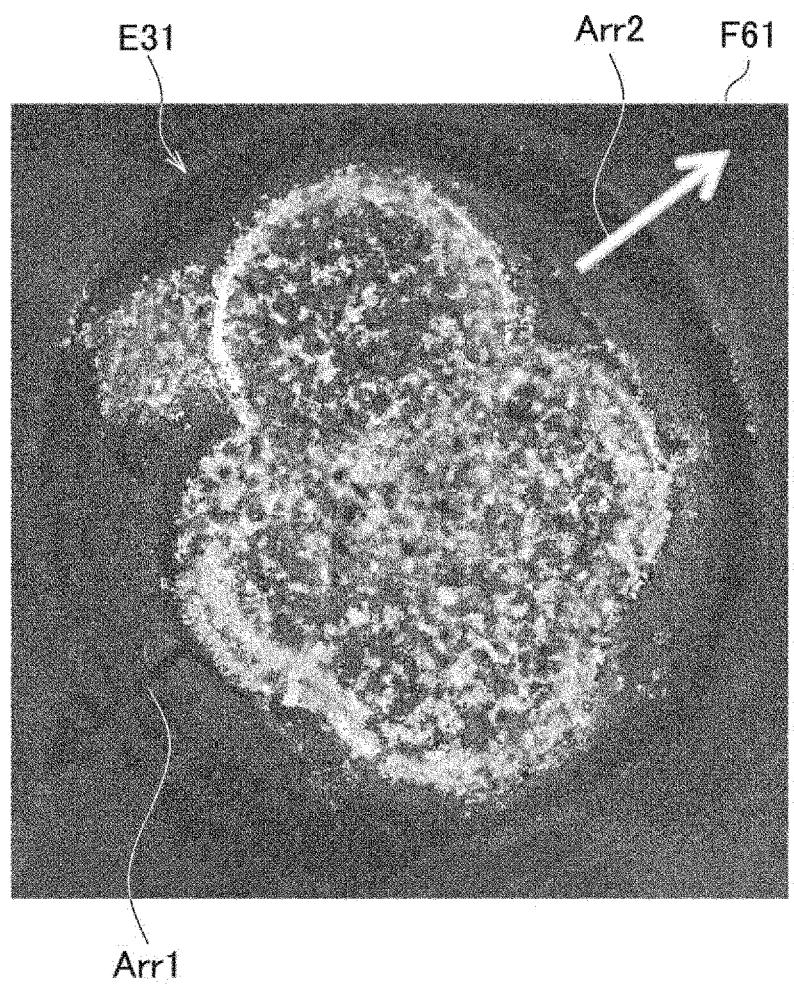

[Fig. 17]
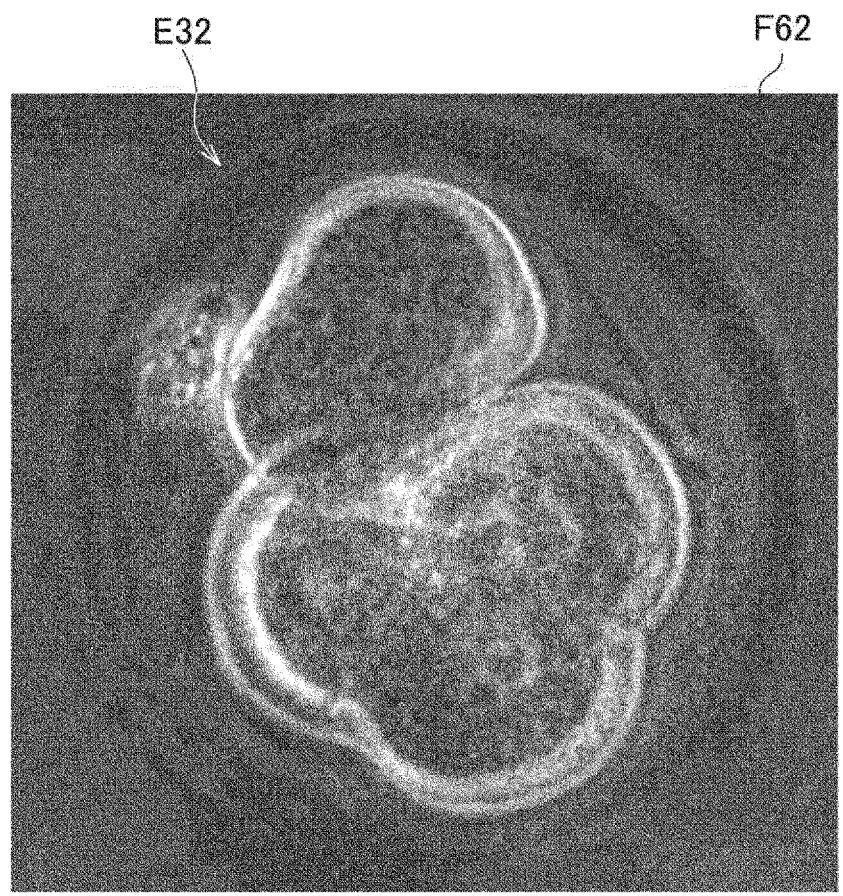

[Fig. 18]
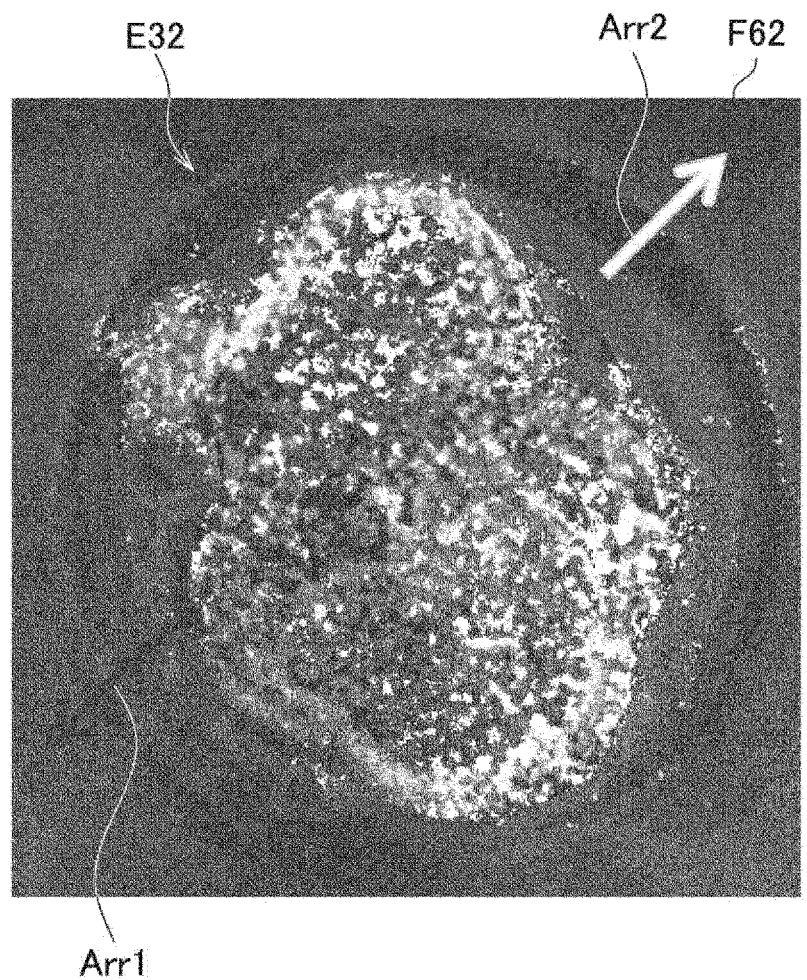

[Fig. 19]
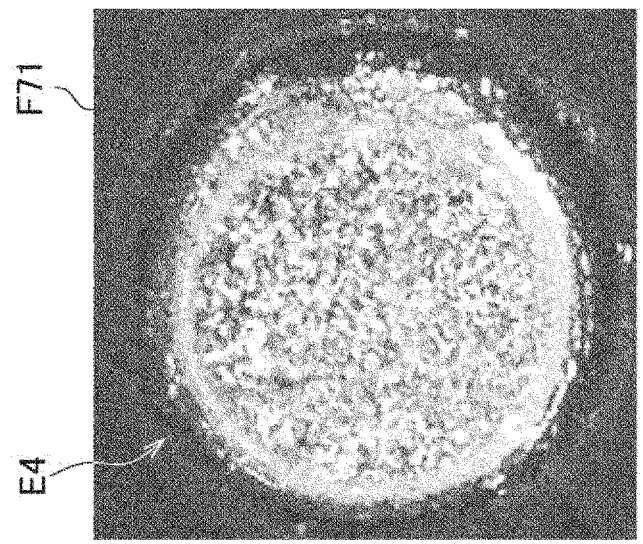
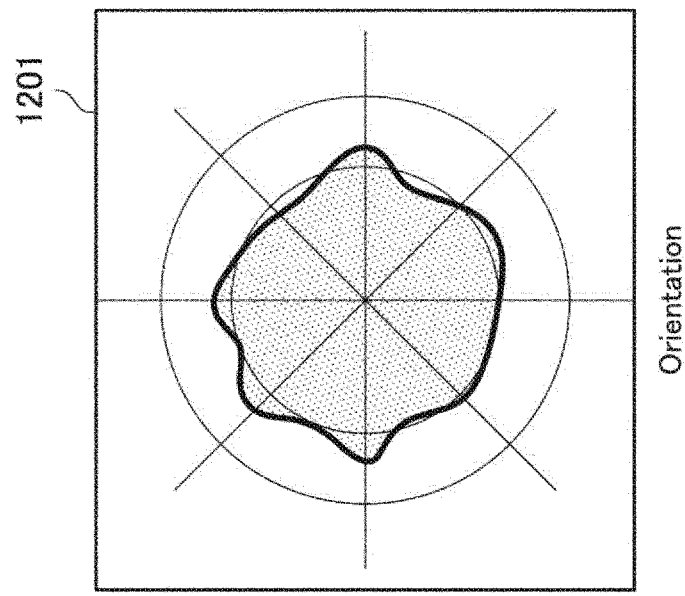

[Fig. 20]
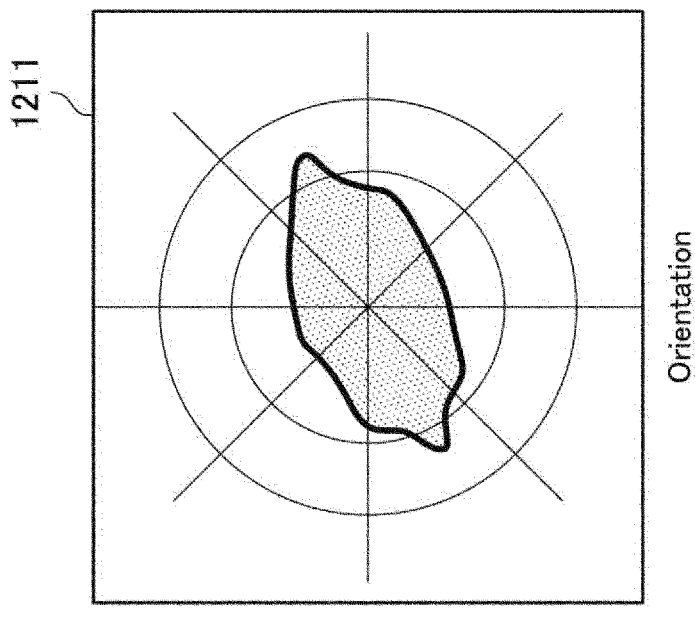
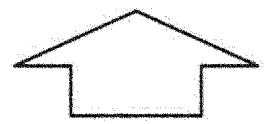
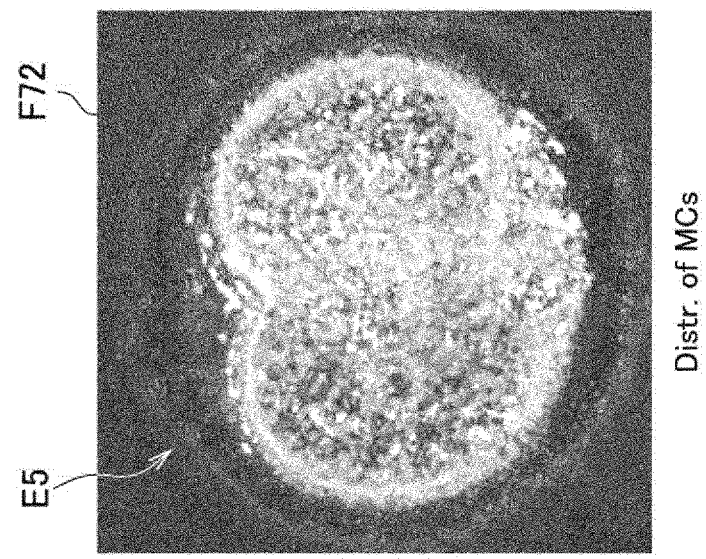

[Fig. 21]
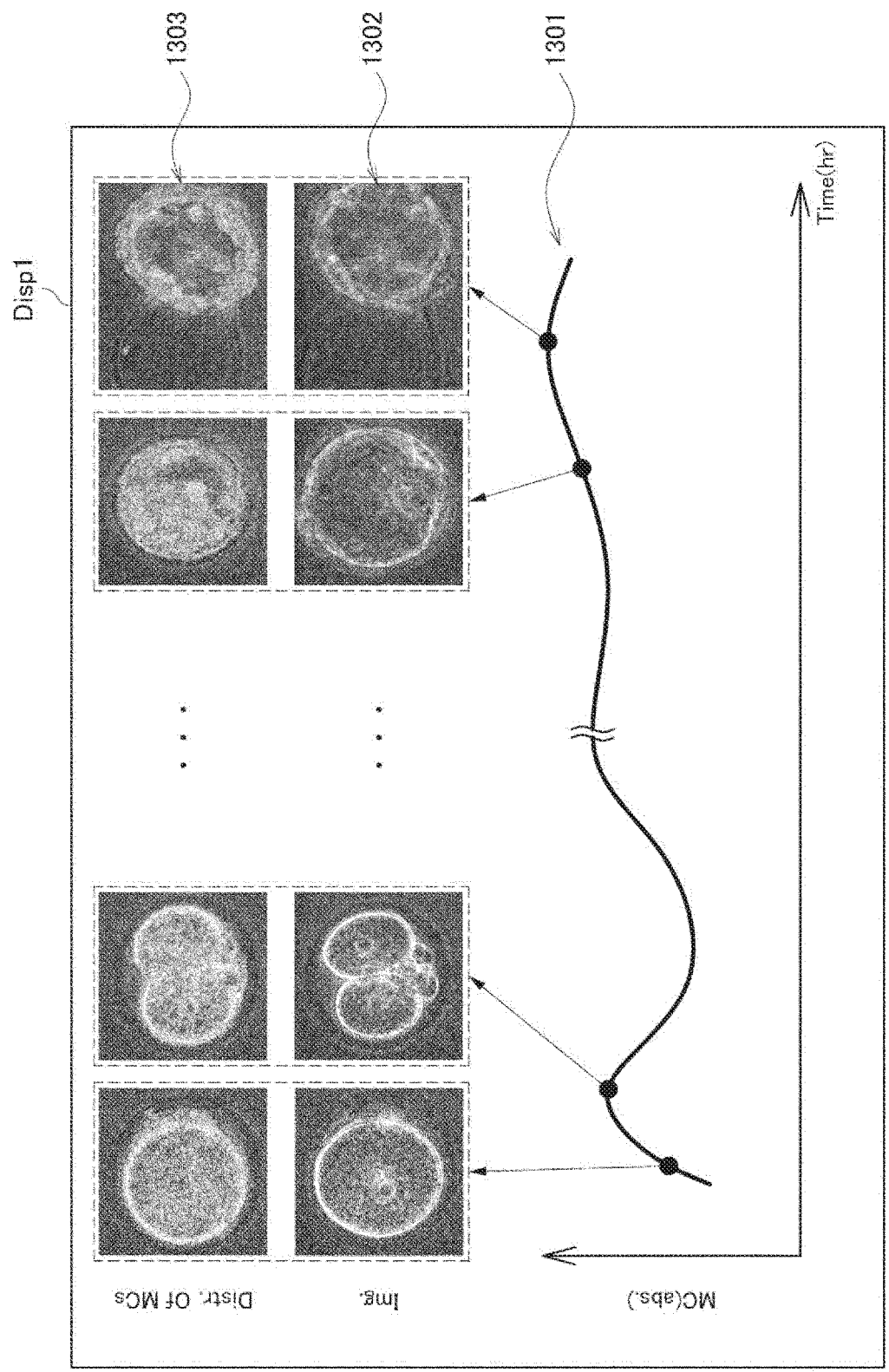

[Fig. 22]
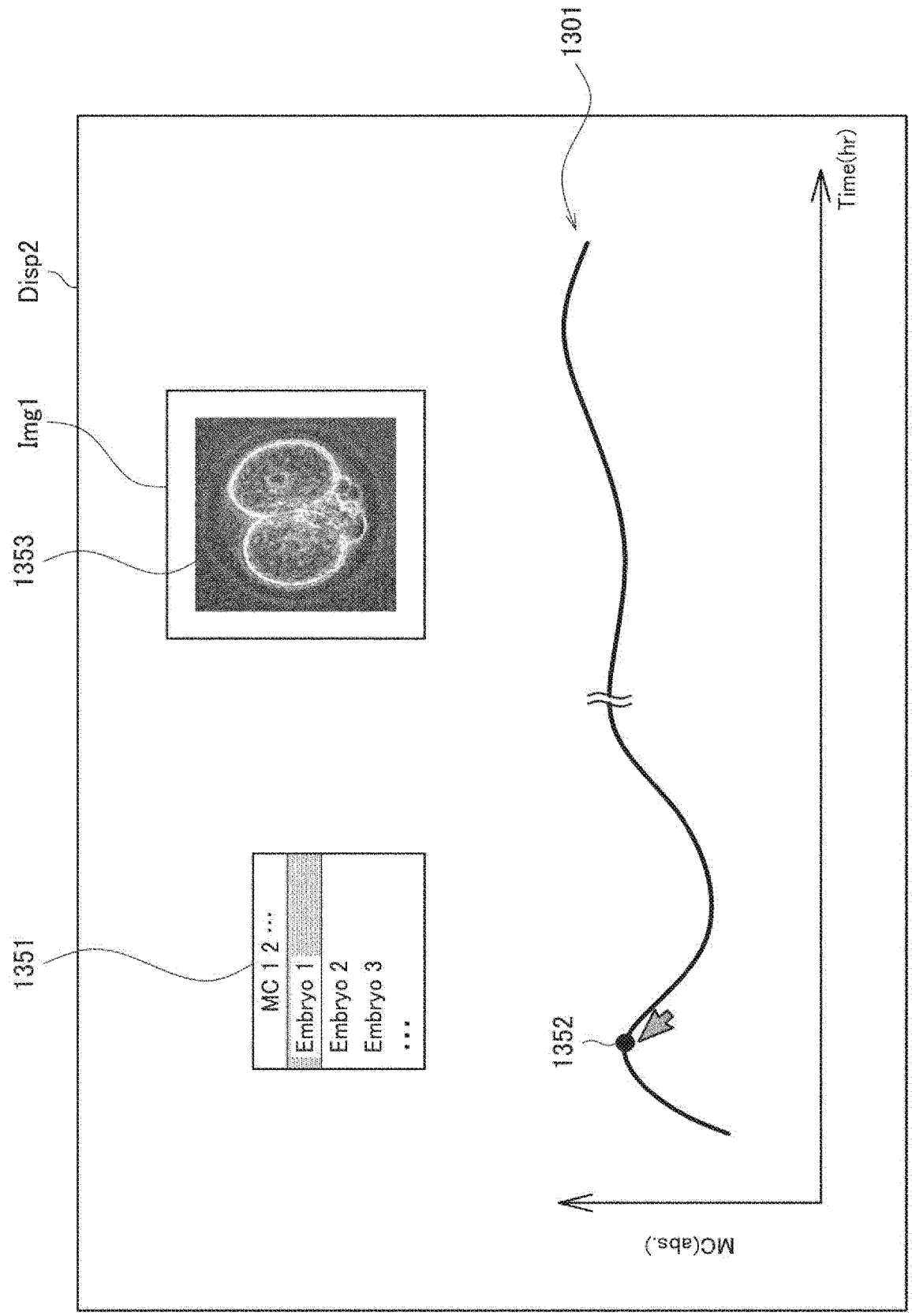

[Fig. 23]
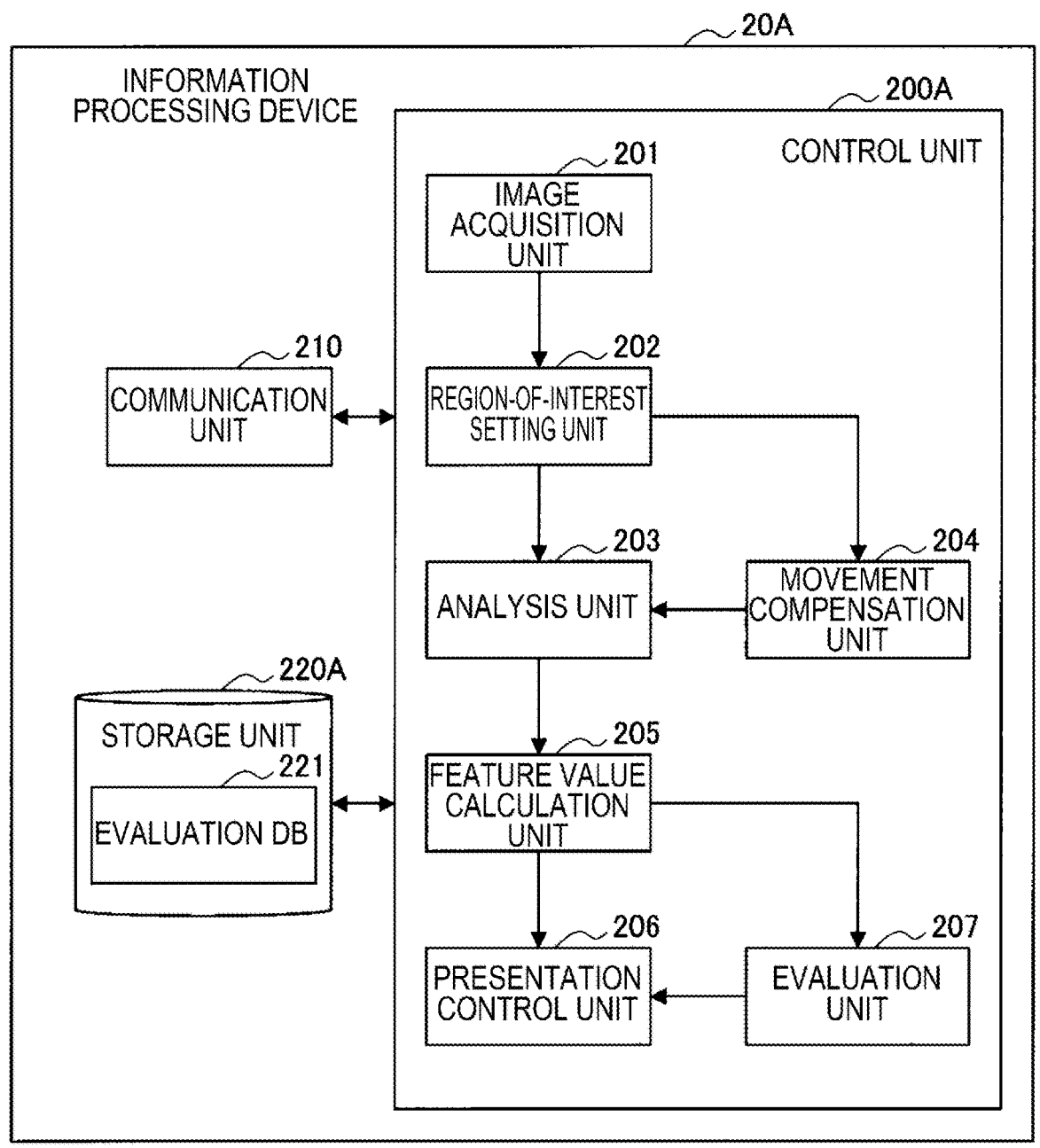

[Fig. 24]
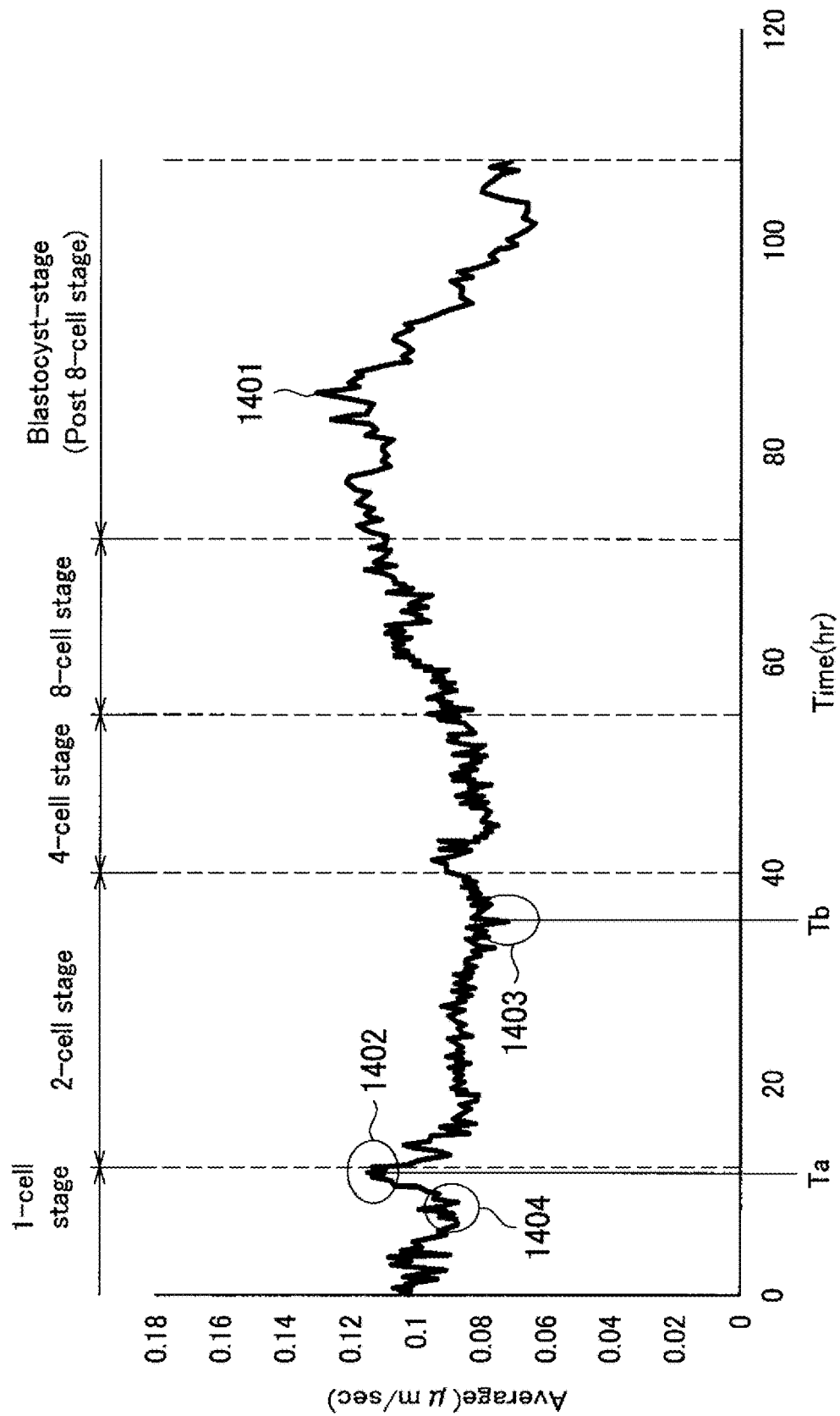

[Fig. 25]
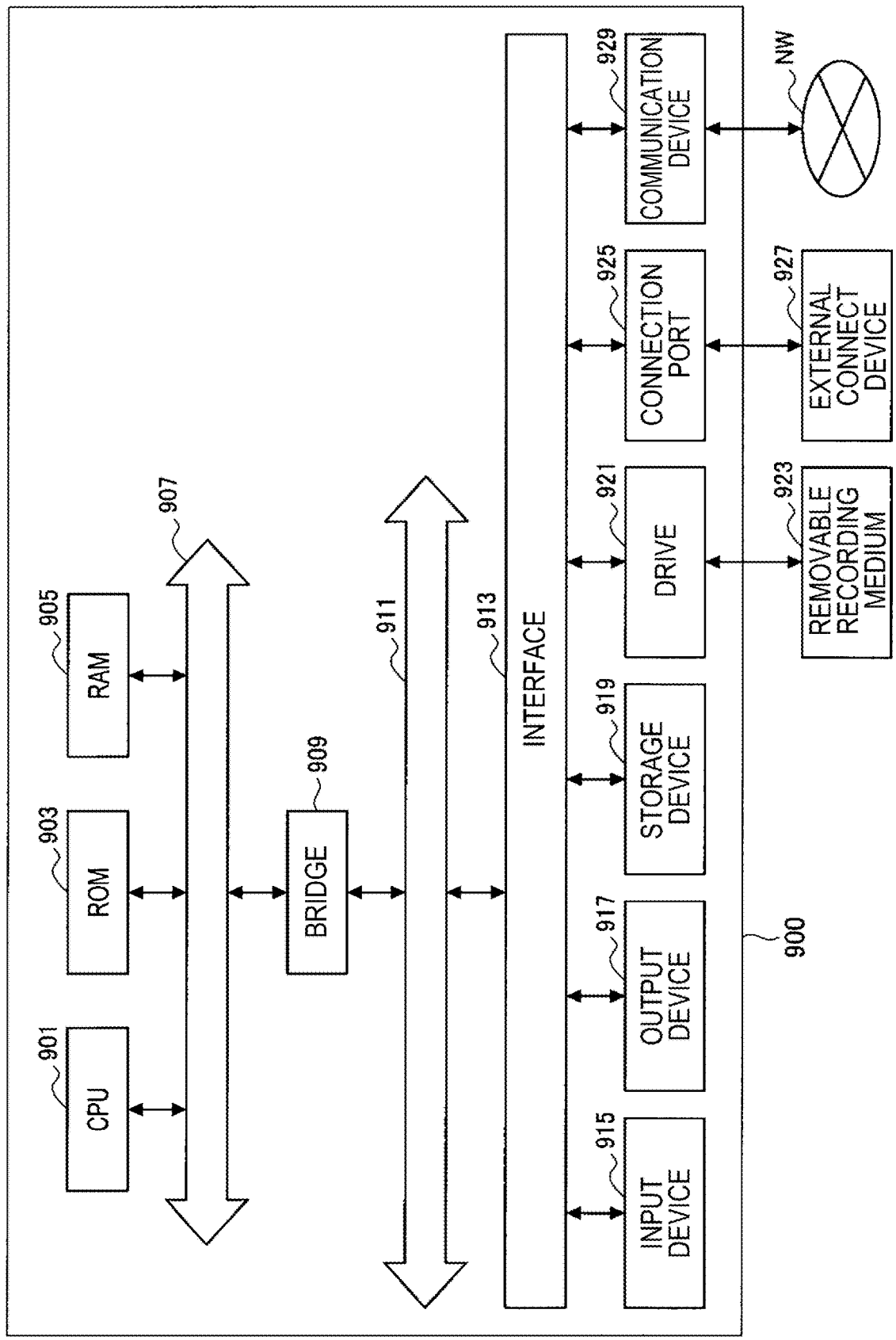

INFORMATION PROCESSING DEVICE, INFORMATION PROCESSING METHOD, AND INFORMATION PROCESSING SYSTEM

CROSS REFERENCE TO RELATED APPLICATIONS

This application claims the benefit under 35 U.S.C. § 371 as a U.S. National Stage Entry of International Application No. PCT/JP2017/024515, filed in the Japanese Patent Office as a Receiving Office on Jul. 4, 2017, which claims priority to Japanese Priority Patent Application JP 2016-210217, filed in the Japanese Patent Office on Oct. 27, 2016, and Japanese Priority Patent Application JP 2016-138937, filed in the Japanese Patent Office on Jul. 13, 2016, each of which is hereby incorporated by reference in its entirety.

TECHNICAL FIELD

The present disclosure relates to an information processing device, an information processing method, and an information processing system.

BACKGROUND ART

In vitro fertilization (IVF) is one of the ways to treat infertility, which is a method of fertilizing an egg cell extracted from a mother's uterus outside the body and returning an embryo obtained by culturing the fertilized egg cell back to the maternal body again. In order to increase a success rate of pregnancy using the IVF, it is necessary to select a high quality embryo with high accuracy.

As a technique for quantitatively selecting a high quality embryo, for example, PTL 1 (JP 2014-520522A) discloses a technique that measures the degree of intracytoplasmic movement of an embryo in a 1-cell stage and/or changes in the shape of the embryo using image analysis and predicts an embryonic development potential (quality) using the measurement result.

CITATION LIST

Patent Literature

PTL 1: JP 2014-520522A

SUMMARY

Technical Problem

However, the technique disclosed in PTL 1 is merely a technique of evaluating the quality of an embryo on the basis of only changes in the form or the like of the embryo in the 1-cell stage. Accordingly, the accuracy of prediction of the quality of the embryo using such a technique is not sufficient.

Thus, the present disclosure proposes an information processing device, an information processing method, a program, and an information processing system which are novel and improved, and capable of evaluating the quality of an embryo with high accuracy.

Solution to Problem

According to the present disclosure, there is provided an information processing device including: an analysis unit that specifies a movement in a region-of-interest relating to an embryo on a plurality of images using the plurality of images including the embryo captured in a time series manner during periods corresponding to a plurality of cell stages; a feature value calculation unit that calculates a movement feature value relating to an inside of the embryo on the basis of the specified movement; and a presentation control unit that controls a presentation of the movement feature values acquired during periods corresponding to at least two cell stages among the plurality of cell stages in order to evaluate a quality of the embryo.

Further, according to the present disclosure, there is provided an information processing method performed by a processor, the method including: specifying a movement in a region-of-interest relating to an embryo on a plurality of images using the plurality of images including the embryo captured in a time series manner during periods corresponding to a plurality of cell stages; calculating a movement feature value relating to an inside of the embryo on the basis of the specified movement; and controlling a presentation of the movement feature values acquired during periods corresponding to at least two cell stages among the plurality of cell stages in order to evaluate a quality of the embryo.

Further, according to the present disclosure, there is provided an information processing system including: an image capture device including an image capture unit that generates an image by image capturing; and an information processing device including an analysis unit that specifies a movement in a region-of-interest relating to an embryo on a plurality of images using the plurality of images including the embryo captured in a time series manner by the image capture unit during periods corresponding to a plurality of cell stages; a feature value calculation unit that calculates a movement feature value relating to an inside of the embryo on the basis of the specified movement; and a presentation control unit that controls a presentation of the movement feature values acquired during periods corresponding to at least two cell stages among the plurality of cell stages, in order to evaluate a quality of the embryo.

Advantageous Effects of Invention

As described above, according to the present disclosure, it is possible to evaluate the quality of an embryo with high accuracy.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram showing an overview of a configuration of an information processing system according to an embodiment of the present disclosure.

FIG. 2 is a functional block diagram showing a functional configuration example of an information processing device according to the embodiment.

FIG. 3 is a diagram showing an example of an image including an embryo acquired by an image acquisition unit according to the embodiment.

FIG. 4 is a diagram showing an example of setting a region-of-interest according to a region-of-interest setting unit according to the embodiment.

FIG. 5 is a diagram showing a first example of a motion vector specified by an analysis unit according to the embodiment.

FIG. 6 is a diagram showing a second example of the motion vector specified by the analysis unit according to the embodiment.

FIG. 7 is a diagram illustrating an example of a movement compensation process in a movement compensation unit according to the embodiment.

FIG. 8 is a diagram illustrating an example of a feature value calculation process in a feature value calculation unit according to the embodiment.

FIG. 9 is a flowchart showing an example of processes in an information processing device according to the embodiment.

FIG. 10 is a diagram showing an example of a presentation of a temporal change of movement feature values in a presentation control unit according to the embodiment.

FIG. 11 is a diagram showing an image of an embryo according to a first example with respect to a presentation of a spatial distribution of movement feature values.

FIG. 12 is a diagram showing a spatial distribution of movement feature values inside the embryo according to the first example with respect to the presentation of the spatial distribution of the movement feature values.

FIG. 13 is a diagram showing an image of an embryo according to a second example with respect to a presentation of a spatial distribution of movement feature values.

FIG. 14 is a diagram showing a spatial distribution of movement feature values inside the embryo according to the second example with respect to the presentation of the spatial distribution of the movement feature values.

FIG. 15 is a diagram showing an image of an embryo according to a third example with respect to a presentation of a spatial distribution of movement feature values.

FIG. 16 is a diagram showing a spatial distribution of movement feature values inside the embryo according to the third example with respect to the presentation of the spatial distribution of the movement feature values.

FIG. 17 is a diagram showing an image of an embryo according to a fourth example with respect to a presentation of a spatial distribution of movement feature values.

FIG. 18 is a diagram showing a spatial distribution of movement feature values inside the embryo according to the fourth example with respect to the presentation of the spatial distribution of the movement feature values.

FIG. 19 is a diagram showing a first example of a presentation relating to an orientation of a movement inside the embryo.

FIG. 20 is a diagram showing a second example of a presentation relating to an orientation of a movement inside the embryo.

FIG. 21 is a diagram showing a first example of an aspect of a presentation in the presentation control unit according to the embodiment.

FIG. 22 is a diagram showing a second example of an aspect of a presentation in the presentation control unit according to the embodiment.

FIG. 23 is a functional block diagram showing a functional configuration example of an information processing device according to a modified example.

FIG. 24 is a graph illustrating an example of indexes used for evaluation of the quality of an embryo in an evaluation unit according to the modified example.

FIG. 25 is a block diagram showing a hardware configuration example of an information processing device according to an embodiment of the present disclosure.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Overview of information processing system
2. Information processing device
2.1. Configuration example
2.2. Process example
2.3. Presentation example of movement feature value
2.4. Effect
2.5. Modified example
3. Hardware configuration example
4. Conclusion

1. OVERVIEW OF INFORMATION PROCESSING SYSTEM

FIG. 1 is a diagram showing an overview of a configuration of an information processing system 1 according to an embodiment of the present disclosure. As shown in FIG. 1, the information processing system 1 is provided with an imaging device 10 and an information processing device 20. The imaging device 10 and the information processing device 20 are connected to each other via various types of wired or wireless networks.

(Imaging Device)

The image capture device 10 is a device that generates an image (or a moving image) through image capturing. The image capture device 10 according to this embodiment is realized by a digital camera, for example. Further, the image capture device 10 may be realized by any device having an image capture function, such as a smartphone, a tablet, a game machine, or a wearable device, for example.

The image capture device 10 according to this embodiment is provided above a dish D1 having a culture medium M1 on which an embryo (fertilized egg cell) which is an observation target is cultured, in an incubator I1 for culture, as shown in FIG. 1. Further, the image capture device 10 generates an image by capturing image of the embryo which is being cultured on the culture medium M1 at a predetermined frame rate. In a case in which a plurality of embryos are present in the dish D1, the image capturing may be performed so that only each of the embryos is included in an image capture frame, or may be performed so that a plurality of embryos are included in one image capture frame. In addition, in a case in which a plurality of embryos are respectively cultured in a plurality of dishes, the image capture device 10 or a corresponding dish may be appropriately moved by an arbitrary drive unit provided in the incubator I1 to capture an image of each embryo.

Further, the image capture device 10 may be provided inside the incubator I1, or may be provided outside the incubator I1. Further, the image capture device 10 can also be applied to image capturing of an embryo which is not contained in the incubator. In addition, the image capture device 10 may be provided integrally with the incubator I1.

Further, a specification, the size, or the like of the incubator I1 is not particularly limited, and an incubator capable of providing an environment suitable for culturing embryos may be applied. With respect to the dish D1 and the culture medium M1, a known dish and culture medium suitable for culturing embryos may also be used.

More specifically, the image capture device 10 according to this embodiment includes an image capture unit 101 and an image capture control unit 102, as shown in FIG. 1.

The image capture unit 101 includes various members such as an imaging element such as a charge coupled device (CCD) or a complementary metal oxide semiconductor (CMOS), a lens for controlling image formation of a subject image on an imaging element, and a light source for irradiating a subject with light, and captures an image of a real space using the members.

The image capture unit 101 according to this embodiment captures an image of a predetermined image capture region including an embryo cultured in the culture medium M1, in order to correctly specify an internal movement of an embryo which is an observation target. Further, the image capture device 101 may directly capture an image of an embryo (without an intervening member such as another lens), or may capture the image of the embryo through another member such as a microscope including an objective lens. In this case, in order to capture an embryonic movement of a submicron meter order, a magnification of the object lens is preferably about 40 to 60 times. Further, a frame rate is not particularly limited, but is preferably set depending on the degree of an observation target change. Specifically, the frame rate is preferably set as a frame rate capable of capturing the embryonic movement of a sub-second order.

A signal generated through an image capture process of the image capture unit 101 is output to the image capture control unit 102.

The image capture control unit 102 includes a processing circuit realized by a central processing unit (CPU), a read only memory (ROM), a random access memory (RAM), and the like, and a communication device, and controls the overall operation of the image capture unit 101. For example, the image capture unit 102 controls an image capture process of the image capture unit 101 and generates a captured image on the basis of a signal obtained by the image capture process.

For example, the image capture control unit 102 may control the timing of the image capture process of the image capture unit 101. More specifically, the image capture control unit 102 may control the image capture unit 101 to continuously perform image capturing for a predetermined period of time to generate a moving image. Further, the image capture control unit 102 may control the image capture unit 101 to intermittently perform image capturing at a predetermined interval. In addition, in a case in which image capturing of a plurality of embryos is performed, the image capture control unit 102 may directly or indirectly control the incubator I1 so that the image capture device 10 or the dish is moved according to the image capture timing of an embryo which is an image capture target.

Further, the image capture control unit 102 may control a wavelength, an irradiation intensity, or an irradiation time of the light source provided in the image capture unit 101. For example, the image capture device 102 may control the light source of the image capture unit 101 to emit light having an appropriate wavelength to an embryo with a minimum irradiation intensity only during the period in which an image capturing process is being performed by the image capture unit 101. Thus, it is possible to minimize phototoxicity in the embryo.

Further, as will be described in detail below, the image capture control unit 102 may set a region-of-interest (ROI) in advance with respect to an image. The region-of-interest mentioned here means a region which is an image to be analyzed by an analysis unit 203 (which will be described below). The region-of-interest according to this embodiment is an internal region of an embryo. Particularly, it is preferable that the region-of-interest is a region corresponding to the cytoplasm of the embryo. A method of setting the region-of-interest will be described below.

The image capture control unit 102 outputs a generated image, or the like to the information processing device 20.

(Information Processing Device)

The information processing device 20 is a device having an image analyzing function. The information processing device 20 is realized by any type of device having an image analyzing function such as a personal computer (PC), a tablet, or a smartphone. The information processing device 20 includes a processing circuit and a communication device. For example, in the information processing device 20 according to this embodiment, the communication device acquires a plurality of images (for example, a moving image, still images which are successively captured, or the like) from the image capture device 10, and the processing unit sets a region-of-interest relating to the inside of an embryo with respect to the acquired images. Further, the processing circuit specifies a movement in the set region-of-interest using image analysis, and calculates a movement feature value. Further, the processing circuit controls a presentation of movement feature values acquired during a period corresponding to at least two cell stages among a plurality of cell stages. The results of the processes performed by the processing circuit of the information processing device 20 are output to a storage device, a display device, or the like provided inside or outside the information processing device 20. Note that the information processing device 20 may be realized by one or a plurality of information processing devices on a network. A functional configuration for realizing the respective functions of the information processing device 20 will be described below.

Furthermore, although the information processing system 1 is constituted with the imaging device 10 and the information processing device 20 in the present embodiment, the present technology is not limited thereto. For example, the imaging device 10 may perform the processes of the information processing device 20 (for example, an analysis process, a feature value calculation process, and a presentation control process). In this case, the information processing system 1 is realized by an image capture device having an analysis function, a feature value calculation function, a presentation control processing function, and the like.

Here, an embryo which is an observation target of the information processing system 1 according to this embodiment will be described. For example, in a normal fertilized egg cell of a human, the pronucleus appears immediately after fertilization, and then, cell division is started. Strictly speaking, a fertilized egg cell is not an embryo but is a pronuclear stage embryo, and in this specification, the fertilized egg cell is also described as one form of the embryo.

In cell division, a normal fertilized egg cell (embryo) which was initially in a 1-cell stage becomes a 2-cell stage embryo, and then, repeats division into a 4-cell stage embryo, an 8-cell stage embryo, and a morula, and finally, reaches a blastocyst stage. Generally, after the blastocyst is attached to a uterus, a transparent body that covers the embryo breaks, and the embryo is hatched.

In a case in which an embryo is cultured in IVF and is transplanted into a uterus, the following methods are used in general. One is a method of evaluating the quality of embryos when 2 or 3 days elapse after fertilization (that is, within a period corresponding to a 4-cell stage or an 8-cell stage), selecting a high quality embryo, and transplanting the high quality embryo into a uterus. However, in the related-art method, the reliability of evaluation of the quality of the embryo is low, and the pregnancy rate is surely not high. Another is a method of culturing an embryo up to about six days after fertilization, and transplanting the embryo that reaches a blastocyst stage into a uterus. However, since a culture period of the embryo is long, the cost for culture is high, and a risk to the embryo due to long-term in vitro culture also exists. Accordingly, a technique that evaluates the quality of an embryo with high accuracy in a relatively short period of time is necessary.

As such a technique that evaluates the quality of an embryo, for example, PTL 1 (JP 2014-520522A) discloses a technique that measures the level of an intracytoplasmic movement in a 1-cell stage embryo and/or changes in the shape of the embryo using image analysis and predicts an embryonic development potential (quality) using the measurement result.

However, such a technique is merely a technique of evaluating the quality of an embryo on the basis of only changes in the form or the like of the embryo in the 1-cell stage. The high quality embryo may show a characteristic intracytoplasmic movement or a change pattern in a 2-cell stage and thereafter, as well as the 1-cell stage. Accordingly, it is substantially difficult to distinguish the quality of the embryo simply in the 1-cell stage. Further, although it is possible to transplant the embryo into a uterus at an early stage, there is doubt as to whether to contribute to improvement of the pregnancy rate as a result.

In this regard, the information processing system 1 according to this embodiment specifies a movement in a region-of-interest relating to an embryo on a plurality of images using the plurality of images including the embryo captured in a time series manner during a period corresponding to a plurality of cell stages, calculates a movement feature value relating to the inside the embryo on the basis of the specified movement, and controls a presentation of movement feature values acquired during a period corresponding to at least two cell stages among the plurality of cell stages in order to evaluate the quality of the embryo. With such a technique, it is possible to quantitatively measure the internal movement of the embryo in each of the plurality of cell stages. If it is possible to quantitatively measure each movement of the embryo that appears in each cell stage, it is possible to evaluate the quality of the embryo with high accuracy.

The overview of the information processing system 1 according to an embodiment of the present disclosure has been described above. The information processing device 20 included in the information processing system 1 according to an embodiment of the present disclosure is realized in the following embodiment. A specific configuration example and a process example of the information processing device 20 will be described below.

2. INFORMATION PROCESSING DEVICE

Hereinafter, the information processing device 20 according to an embodiment of the present disclosure will be described with reference to FIGS. 2 to 24.

2.1. Configuration Example

FIG. 2 is a functional block diagram showing a functional configuration example of the information processing device 20 according to an embodiment of the present disclosure. As shown in FIG. 2, the information processing device 20 according to this embodiment includes a communication unit 210 and a storage unit 220. Functions of the control unit 200 are realized by a processing circuit such as a central processing unit (CPU) included in the information processing device 20. In addition, the function of the communication unit 210 is realized by a communication device provided in the information processing device 20. Further, functions of the storage unit 220 are realized by a storage device such as a storage included in the information processing device 20. Hereinafter, the respective functional units will be described.

(Control Unit)

The control unit 200 controls the overall operation of the information processing device 20. Further, the control unit 200 includes respective functions of an image acquisition unit 201, a region-of-interest setting unit 202, an analysis unit 203, a movement compensation unit 204, a feature value calculation unit 205, and a presentation control unit 206 as shown in FIG. 2, and proactively controls the operation of the information processing device 20 according to this embodiment. The functions of the respective functional units included in the control unit 200 will be described below.

(Communication Unit)

The communication unit 210 is a communication section that the information processing device 20 has, and performs various types of communication with external devices in a wireless or a wired manner via a network (or directly). For example, the communication unit 210 performs communication with the imaging device 10. More specifically, the communication unit 210 acquires an image generated by the imaging device 10. In addition, the communication unit 210 may perform communication with devices other than the imaging device 10. For example, the communication unit 210 may transmit information or the like relating to an image acquired by the image acquisition unit 201 and a presentation controlled by the presentation control unit 206 to an external display device.

(Storage Unit)

The storage unit 220 is a storage means provided in the information processing device 20, and stores information acquired by the communication unit 210, information acquired by the respective functional units of the control unit 200, or the like. Further, the storage unit 220 appropriately outputs information stored therein according to requests of the respective functional units of the control unit 200 or the communication unit 210.

Next, functions of the respective functional units included in the control unit 200 will be described.

(Image Acquisition Unit)

The image acquisition unit 201 has a function of acquiring an image including an embryo. The image may be a moving image obtained by continuous image capturing for a predetermined period, or may be a plurality of still images obtained in a time series manner by intermittent image capturing. For example, the acquired image may be a moving image obtained by image capturing for a certain time at a predetermined time interval for every a predetermined cycle. Thus, it is possible to reduce phototoxicity against an embryo associated with image capturing and to reduce the load associated with such image processing for evaluation, and then efficient image processing can be performed.

Further, the image may be an image relating to one or a plurality of embryos. The image relating to the plurality of embryos means an image in which each of the plurality of embryos is included in an image capture frame, or an image in which a plurality of embryos are included in one image capture frame.

The image acquisition unit 201 acquires, for example, an image including an embryo captured by the image capture unit 101 of the image capture device 10. Specifically, the image acquisition unit 201 may acquire an image including an embryo, captured in real time by the image capture unit 101 of the image capture device 10 through the communication unit 210. In this case, each process for evaluation of the quality of an embryo which is an image capture target in each stage functional unit in post stages can be performed in real time. Further, the image acquisition unit 201 may acquire an image captured by the image capture unit 101 of the image capture device 10 in advance and stored in the storage unit 220, from the storage unit 220. In this case, a process for evaluation of the quality of an embryo of which an image is captured in advance may be performed as a post process.

Furthermore, in order to enhance the accuracy of each post-stage process, the image acquisition unit 201 may appropriately perform calculation or the like, and may perform compensation such as interpolation, noise removal, or rotation with respect to an acquired image.

The image acquisition unit 201 outputs an acquired image to the region-of-interest setting unit 202. Further, as will be described below in detail, in a case in which the region-of-interest is set in advance with respect to the acquired image, the image acquisition unit 201 may output the acquired image to the analysis unit 203.

(Region-of-Interest Setting Unit)

The region-of-interest setting unit 202 has a function of setting a region-of-interest with respect to an acquired image. The region-of-interest means a region which is an analysis target in a post-stage analysis process in an occupied region of an image. The region-of-interest according to this embodiment is a region corresponding to the inside of an embryo included in an image. Specifically, the inside of the embryo may be cytoplasm included in a central part of the embryo. Thus, it is possible to specify a movement of the cytoplasm of the embryo in a post-stage analysis process, or the like. For example, in a case in which changes in the shape of an embryo are to be analyzed, the region-of-interest may be set as a region corresponding to a transparent film of the embryo (a portion corresponding to an interface with the external environment), in addition to cytoplasm.

A method of setting a region-of-interest will be described with reference to FIGS. 3 and 4. FIG. 3 is a diagram showing an example of an image F1 including an embryo E1 acquired by the image acquisition unit 201 according to this embodiment, and FIG. 4 is a diagram showing an example of setting a region of region R1 by the region-of-interest setting unit 202 according to this embodiment. In the image F1 shown in FIG. 3, an image of the embryo E1 in a 1-cell stage is captured, and one cytoplasm CF1 in a stage in which the pronucleus is fused is present in a central portion of the embryo E1. The region-of-interest setting unit 202 sets a region surrounded by a portion corresponding to a contour of the cytoplasm CF1 as the region-of-interest R1, as shown in FIG. 4.

The region-of-interest setting unit 202 may set a region-of-interest on the basis of a user's operation on an input device (not shown) (for example, a known input device such as a mouse, a touch pen, or a touch panel). Further, the region-of-interest setting unit 202 may set a region-of-interest using an arbitrary image analysis method based on a known algorithm or the like such as binary image conversion, Hough transform, or machine learning. In addition, the region-of-interest setting unit 202 may estimate movements of a region-of-interest on a plurality of images set for one image on the basis of an algorithm such as optical flow, to thereby set a region-of-interest for the plurality of images. Thus, the region-of-interest can be automatically set for the plurality of images which are analysis targets of internal movements of an embryo.

Further, as described above, in a case in which a region-of-interest is set in advance by the image capture device 10 or the like for an acquired image, the function of the region-of-interest setting unit 202 may not be used.

The region-of-interest setting unit 202 outputs an image in which a region-of-interest is set to the analysis unit 203.

(Analysis Unit)

The analysis unit 203 has a function of specifying movements on a plurality of images in a region-of-interest relating to a set embryo. The movements in the region-of-interest mean movements on a plurality of images caused by movements of the inside (cytoplasm) of an embryo corresponding to the region-of-interest.

The analysis unit 203 may specify a motion vector as a movement in a region-of-interest, for example. Such a motion vector may be specified by a block matching method, for example. The block matching method is a method of dividing an image into a plurality of blocks formed by, for example, N×N pixels, searching for a block which is most approximate to a block in a region-of-interest from preceding and succeeding frames, and calculating a motion vector on the basis of a difference therebetween. The analysis unit 203 specifies a motion vector using a block matching method for a plurality of blocks included in a region-of-interest. Thus, it is possible to quantitatively obtain a complicated movement inside an embryo corresponding to the region-of-interest.

Further, the motion vector is not specified by only the above-described block matching method, but may also be specified by a known algorithm based on optical flow such as a gradient method.

Next, an example of a movement (motion vector) actually specified by the analysis unit 203 will be described. FIGS. 5 and 6 are diagrams showing a first example and a second example of a motion vector specified by the analysis unit 203 according to this embodiment.

An embryo E1 shown in the image F1 in FIG. 5 is a 1-cell stage embryo, similar to the embryo E1 shown in FIGS. 3 and 4. In the region-of-interest R1 set for the embryo E1, a plurality of motion vectors MB1 may be specified by the analysis unit 203. The motion vectors MB1 indicate large movement amounts and random orientations, as shown in FIG. 5. This shows that an internal movement of the embryo is active.

On the other hand, an embryo E2 shown in an image F2 in FIG. 6 is an embryo that has just reached a 2-cell stage. That is, the embryo E2 is an embryo immediately after cell division. In this case, a region-of-interest R2 may be set by the region-of-interest setting unit 202 with respect to the inside of the embryo E2 (the inside of two divided cells). Further, motion vectors MB2 in the region-of-interest R may be specified by the analysis unit 203. The motion vectors MB2 indicates directions in which two divided cells are separated from each other, as shown in FIG. 6. That is, the specified motion vectors may indicate that the cytoplasm moves in directions of division.

The analysis unit 203 outputs data relating to a specified internal movement of an embryo to the feature value calculation unit 205.

(Movement Compensation Unit)

The information processing device 20 according to this embodiment may include the movement compensation unit 204. The movement compensation unit 204 has a function of compensating for an image in which a region-of-interest is set. For example, in a case in which an embryo relating to a region-of-interest performs a rotating movement on a plurality of captured images, an internal movement of the embryo becomes a movement which is a combination of a movement caused by a motion of the cytoplasm and a movement of the entire embryo. Such a movement of the entire embryo may be generated by an external factor such as vibration of the culture medium M1, a motion of the entire embryo, or an inertial force. In a case in which such a movement of the entire embryo is included therein, it is difficult to precisely specify only the internal movement of the embryo.

Further, the movement compensation unit 204 performs movement compensation with respect to an image in which a region-of-interest is set, acquired from the region-of-interest setting unit 202. For example, the movement compensation unit 204 detects movements of the entire embryo on a plurality of images, and performs movement compensation with respect to images in which the embryo is included on the basis of the detection result.

FIG. 7 is a diagram for illustrating an example of a movement compensation process in the movement compensation unit 204 according to this embodiment. As shown in FIG. 7, it is assumed that the entirety of an embryo E2 in a 2-cell stage rotates clockwise along an arrow Rot1. In this case, the cytoplasm MB2 in which a region-of-interest R3 is set also rotates along with the entire embryo. Thus, the movement compensation unit 204 detects the rotation of the entire embryo, calculates a rotation angle (an example of a movement compensation amount) of an image F3 for canceling the rotation on the basis of the detection result, and rotates the image F3 by the rotation angle along an arrow C1. Thus, it is possible to specify a movement in the region-of-interest R3 after deducting a movement based on the rotation of the entire embryo with high accuracy by the analysis unit 203.

Further, FIG. 7 shows an example of the movement compensation process with respect to the movement based on the rotation of the entire embryo, but the present technique is not limited to such an example. For example, the movement compensation unit 204 may perform a movement compensation process with respect to a movement of the entire embryo in a translation direction, as well as the rotation of the entire embryo. Thus, it is possible to specify a movement in the region-of-interest R3 after deducting the movement of the entire embryo in the translation direction with high accuracy by the analysis unit 203.

Note that a known technique relating to movement compensation may be used for the detection of the movement of the entire embryo. For example, the movement compensation unit 204 may detect movements on a plurality of images in a portion corresponding to a transparent film (membrane) of an embryo (a portion corresponding to an interface with the external environment), may calculate movement compensation amounts on the basis of movement components thereof, and may perform movement compensation with respect to the images using the movement compensation amounts.

The movement compensation unit 204 may output an image (in which a region-of-interest is set) which has been subjected to the movement compensation process to the analysis unit 203. In this case, the analysis unit 203 specifies a movement in a region-of-interest set in an image after the movement compensation process.

(Feature Value Calculation Unit)

The feature value calculation unit 205 has a function of calculating a movement feature value relating to the inside of an embryo on the basis of a movement specified by the analysis unit 203.

The movement feature value means a value indicating a feature of an internal movement of an embryo at a certain point in time. For example, as the movement feature value, a movement feature value based on a movement amount or a movement direction of a movement in a region-of-interest is included. The movement amount means the magnitude of a movement per unit time (unit frame). Further, the movement direction means a direction of a movement per unit time (unit frame). The movement amount and the movement direction may correspond to a norm and a direction of a specified motion vector, for example.

The movement feature amount based on the movement amount may be a representative value of movement amounts relating to a plurality of movements at an image capture time point specified for a region-of-interest of an image including an embryo, for example. The representative value may be a statistical value such as an average value, a median value, a mode, a maximum value, a minimum value, a variance or a standard deviation of a plurality of movement amounts.

Further, in a case in which the image is a moving image obtained by image capturing for a predetermined period of time $t_{meas}$ at a predetermined cycle $t_{int}$ described above, a movement feature value based on a movement amount may be a statistical value such as an average value, a median value, a mode, a maximum value, a minimum value, a variance or a standard deviation of representative values of movement amounts obtained for respective frames that form the moving image obtained by image capturing for the predetermined period of time $t_{meas}$. Thus, the movement feature value in the predetermined period of time $t_{meas}$ is calculated.

The above-described example will be described in detail with reference to FIG. 8. FIG. 8 is a diagram for illustrating an example of a feature value calculation process in the feature value calculation unit 205 according to the embodiment. Referring to FIG. 8, first, it is assumed that an image of an embryo is captured for the predetermined period of time $t_{meas}$ at the predetermined cycle $t_{int}$. The predetermined period during which the image capturing is performed is referred to as an image capture target period 1011.

The feature value calculation unit 205 calculates an average value of movement amounts relating to a plurality of movements in each of images captured in the image capture target period 1011 first. Here, time series data of the average values of the movement amounts obtained in this way is indicated as a graph 1101.

Next, the feature value calculation unit 205 calculates a movement feature value corresponding to the image capture target period 1011. The calculated movement feature value may be an average value of the time series data of the average values of the movement amounts indicated in the graph 1101. The obtained movement feature value is plotted on a graph in which a horizontal axis represents time and a vertical axis represents a movement feature value. For example, as shown in FIG. 8, movement feature values corresponding to respective image capture target periods

1011*a* to 1011*d* are plotted as plots 1001*a* to 1001*d*. Further, a time series graph 1001 of the movement feature values is acquired by drawing a straight line or a curve for interpolating these plots. Such a graph 1001 may be acquired by the presentation control unit 206 (which will be described below).

In addition, the movement feature value according to this embodiment is not limited to only a movement feature value based on a movement amount of a specified movement, and may also be a movement feature value based on a movement direction. Further, movement feature value may be a movement feature value based on both a movement amount and a movement direction. In this case, the movement feature value is not a simple value, and may be calculated as data having a two-dimensional array of the movement amount and the movement direction. Thus, as will be described below, it is possible to recognize an orientation of an internal movement of an embryo, and to predict a movement such as degeneration, division or hatching of the embryo.

Further, the movement feature value according to this embodiment may be a movement feature value based on the size, position, or the like of a region of a portion in which a movement for satisfying a certain condition (referred to as a "movement region") is specified among predetermined regions in a region-of-interest. The movement region may be an entire region-of-interest, or may be a central portion or a contour neighboring portion of the region-of-interest. By calculating the movement feature value based on such a movement region, it is possible to capture a specific movement inside an embryo.

In addition, the feature value calculation unit 205 may simultaneously calculate a plurality of types of movement feature values, as well as one type of movement feature value. For example, the feature value calculation unit 205 may simultaneously calculate a movement feature value obtained by an average value of movement amounts and a movement feature value obtained by a standard deviation of movement directions. Thus, even when an average value of apparent movement amounts is not changed over time, in a case in which a significant change is found in a movement direction, it is possible to predict that division in the cytoplasm or the like occurs.

The feature value calculation unit 205 outputs an acquired movement feature value to the presentation control unit 206.

(Presentation Control Unit)

The presentation control unit 206 has a function of controlling a presentation of movement feature values for evaluating the quality of an embryo.

In this specification, the evaluation of the quality of the embryo refers to determination of whether to select an embryo which is an observation target as an embryo suitable for being transplanted into a uterus of the maternal body. As the presentation control unit 206 controls a presentation of movement feature values acquired in the feature value calculation unit 205, a user who uses the information processing device 20 according to this embodiment can easily evaluate the quality of an embryo with reference to the presentation.

The presentation control unit 206 according to this embodiment controls a presentation of movement feature values acquired in periods corresponding to at least two cell stages among a plurality of cell stages. The two cell stages may be, for example, two consecutive cell stages such as a 1-cell stage and a 2-cell stage, or may be two separated cell stages such as a 1-cell stage and a 4-cell stage. Further, a division stage exists between one cell stage and another cell stage, but the division stage is not necessarily included in the above-described period.

For example, the presentation stage 206 may control a presentation of movement feature values acquired during a period up to a 2-cell stage of an embryo (for example, immediately after fertilization, or a 1-cell stage to a 2-cell-stage). During the period up to the 2-cell stage, a rapid movement change (that is, oscillation), which is said to be caused by gene expression mainly derived from an egg cell or an approximately periodic movement change may be seen inside the embryo. As specific description will be made in a presentation example of the presentation control unit 206, by capturing the above-mentioned movement derived from the egg cell, it is possible to easily determine whether an intracytoplasmic movement of an embryo is active, that is, the quality of the embryo.

Further, the presentation control unit 206 may control a presentation of movement feature values acquired in a period corresponding to a 4-cell stage and stages thereafter of an embryo (for example, from the 4-cell stage to the 8-cell stage or the blastocyst stage). During the period corresponding to the 4-cell stage and stages thereafter, a moderate movement change which is said to be caused by gene expression mainly derived from a sperm cell may be seen inside the embryo. As specific description will be made in a presentation example of the presentation control unit 206, by capturing the above-described movement derived from the sperm cell, it is possible to easily determine whether an intracytoplasmic movement of an embryo in a 4-cell stage and stages thereafter is active, that is, the quality of the embryo. Particularly, since it is difficult to confirm the presence of an internal movement of an embryo derived from a sperm cell unless it is in the 4-cell stage and thereafter as described above, the accuracy when determining the quality of the embryo in the 4-cell stage and thereafter may be higher than that when determining the quality of the embryo up to the 2-cell stage.

In this way, by focusing on an internal movement of an embryo during a period corresponding to a cell stage in which gene expression derived from an egg cell and/or a sperm cell may be seen, it is possible to evaluate the quality of the embryo with high accuracy and more efficiently. Accordingly, it is possible to transplant an embryo which is evaluated to have high quality into the maternal body at an early stage.

Further, the presentation control unit 206 not only may control a presentation of a temporal change of movement feature values during the above-described period, but may also perform analysis for the temporal change and may control a presentation of the analysis result. For example, the presentation control unit 206 may frequency-analyze time series data of movement feature values, and may control a presentation relating to a global change and/or a local variation of the time series data of the movement feature values, obtained as a result thereof.

In addition, the presentation control unit 206 may perform peak analysis (including peak intensity analysis and inter-peak distance analysis) on time series data of movement feature values, and may control a presentation relating to a local variation of the time series data of the movement feature values, obtained as a result thereof. Particularly, by performing the inter-peak distance analysis, it is possible to more precisely recognize a cycle of the local variation.

Furthermore, the presentation control unit 206 may analyze time series data of movement feature values using a method of determining the degree of similarity to previously accumulated data using regression fitting or a learning machine, and may control a presentation relating to a global change of the time series data of the movement feature values, obtained as a result thereof.

The presentation relating to the global change or the local variation of the time series data of the movement feature values may be an approximate curve indicating the tendency of gene expression, for example. Accordingly, by controlling the presentation relating to the global change and the local variation, it is possible to easily determine whether the gene expression occurs inside an embryo, that is, whether the quality of the embryo is good or bad.

These specific presentation examples will be described below. Further, content presented by the presentation control unit 206 may be appropriately changed by an operation of a user, for example.

2.2. Processing Example

The configuration and the functions of the information processing device 20 according to an embodiment of the present disclosure have been described above. Next, an example of processes in the information processing device 20 according to an embodiment of the present disclosure will be described with reference to FIG. 9.

FIG. 9 is a flowchart showing an example of processes in the information processing device 20 according to an embodiment of the present disclosure. The flowchart shown in FIG. 9 shows an example of a flow of processes of acquiring a series of images including an embryo captured during periods corresponding to a plurality of cell stages from the image capture device 10 and controlling a presentation of movement feature values relating to the inside of the embryo from the series of images thereof.

First, the image acquisition unit 201 acquires a series of images including an embryo captured during periods corresponding to a plurality of cell stages through the communication unit 210 from the image capture device 10 (S101).

Then, the region-of-interest setting unit 202 sets a region-of-interest for the obtained series of images (S103).

Then, the analysis unit 203 specifies a movement in the region-of-interest with respect to the series of images in which the region-of-interest is set (S105). Further, the feature value calculation unit 205 calculates a movement feature value relating to the inside of an embryo on the basis of the specified movement (S107).

Thereafter, the presentation control unit 206 controls a presentation of the calculated movement feature value (S109).

The above-described processes are repeatedly performed every time when an image is acquired in a case in which the embryo is cultured in real time. On the other hand, in a case in which the culturing of the embryo has already been completed, the above-described processes may be collectively performed at once as post processing. In this case, for example, the processes may be performed with respect to images acquired during the entirety or a part of periods corresponding to a plurality of cell stages.

2.3. Presentation Control Examples

The configuration example and the process example of the information processing device 20 according to an embodiment of the present disclosure have been described above. Next, examples of presentations controlled by the presentation control unit 206 according to this embodiment will be described.

(Presentation of Temporal Change of Movement Feature Values)

FIG. 10 is a diagram showing an example of a presentation of a temporal change of movement feature values in the presentation control unit 206 according to this embodiment. As shown in FIG. 10, the presentation control unit 206 may present time series data indicating a temporal change of movement feature values during periods corresponding to multiple cell stages as a graph.

Specifically, the presentation control unit 206 may present the time series data of the movement feature values as a graph 1101. The graph 1101 shown in FIG. 10 shows time series data of movement feature values from the time when image capturing is started after fertilization of a fertilized egg to the time when 90 hours have elapsed that time. Note that the movement feature values shown in the graph in FIG. 10 are average values of movement amounts in a region-of-interest measured for each predetermined time.

As shown in FIG. 10, the graph 1101 shows a global change and a local variation of the movement feature values. For example, during an end period (a region 1103a) of a 1-cell stage and an intermediate period (a region 1103b) of a 2-cell stage, a characteristic oscillation is observed. It is said that the oscillation in the region 1103a is caused by cell division from the 1-cell stage to the 2-cell stage, and it is said that the oscillation in the region 1103b is caused by gene expression derived from an egg cell peculiar to the 2-cell stage. Accordingly, if such an oscillation is captured, it is possible to determine that the activity of an embryo is high.

Further, a gradual change (a region 1103c) indicating that the movement feature values gradually increase from a later period of a 4-cell stage to an early period of an 8-cell stage and gradually decrease in the 8-cell stage and thereafter is observed. It is said that the change indicated by the region 1103c is caused by gene expression derived from a sperm cell. Accordingly, if such a change is captured, it is possible to determine that gene expression derived from a sperm cell occurs in an embryo and the embryo smoothly proceeds to the next stage.

Further, during a later period of a blastocyst stage, it is observed that the oscillation of the movement feature values rapidly increases. It is considered that the rapid increase in oscillation is caused by a significant change in an internal structure of the embryo that accompanies with cell division changes from a morula to a blastocyst. Accordingly, if such an oscillation is captured, it is possible to determine that the embryo has reached the blastocyst stage.

In order to capture such a global change and a local variation, the presentation control unit 206 may perform analysis of time series data of the movement feature values, and may present an analysis result thereof. For example, the presentation control unit 206 may present a curve (approximate curve) 1102 indicating the global change of the time series data of the movement feature values as shown in FIG. 10, by performing analysis using the above-described frequency analysis, and the method of determining the degree of similarity to previously accumulated data using regression fitting or a learning machine. Further, the presentation control unit 206 may specify portions (regions 1103a, 1103b, and 1103d) indicating local variations by performing the above-described frequency analysis or the peak analysis. By performing presentation with respect to the tendency of a change in a curve indicating a global change of time series data of movement feature values, the presence or absence of a local variation thereof, oscillation intervals thereof, magnitudes of oscillations, the number of oscillations, or oscillation time points, it is possible to easily evaluate the quality of an embryo with high accuracy.

Accordingly, by capturing the tendency or oscillation in the temporal change of the movement feature values, it is possible to evaluate the quality of an embryo with high accuracy.

(Presentation of Spatial Distribution of Movement Feature Values)

FIGS. 11 to 18 are diagrams for illustrating examples of presentations of spatial distributions of movement feature values in the presentation control unit 206 according to this embodiment. As shown in the respective diagrams, the presentation control unit 206 may present a spatial distribution of movement feature values.

FIGS. 11 and 12 are diagrams showing a first example of an image of an embryo and a spatial distribution of movement feature values relating to the inside of the embryo. Further, FIGS. 13 and 14 are diagrams showing a second example of an image of an embryo and a spatial distribution of movement feature values relating to the inside of the embryo. The tints of plots of the movement feature values shown in FIGS. 12 and 14 correspond to movement amounts (um/sec) relating to movements in a region-of-interest relating to an embryo.

Referring to FIG. 12, in the first example, movement feature values inside an embryo E21 included in an image F4 indicate large values as a whole. From this reason, it is possible to determine that an internal movement of the embryo E21 is active and the cytoplasm is active.

On the other hand, referring to FIG. 14, in the second example, movement feature values inside an embryo E22 included in an image F5 show small value or 0 at a central portion. From this, it is possible to determine that an internal movement of the embryo E22 is suppressed, and that there is a possibility that degeneration is occurring in the embryo E22.

FIGS. 15 and 16 are diagrams showing a third example of an image of an embryo and a spatial distribution of movement feature values relating to the inside of the embryo. FIGS. 17 and 18 are diagrams showing a fourth example of an image of an embryo and a spatial distribution of movement feature values relating to the inside of the embryo. The tints of plots of the movement feature values shown in FIGS. 16 and 18 correspond to movement directions relating to movements in a region-of-interest relating to an embryo. That is, the tints of these plots correspond to movement directions indicated by either an arrow Arr1 or an arrow Arr2. For example, plots close to the tint of the arrow Arr1 have movement feature values corresponding to the movement direction of the arrow Arr1, and plots close to the tint of the arrow Arr2 have movement feature values corresponding to the movement direction of the arrow Arr2.

Referring to FIG. 16, in the third example, a spatial distribution of movement feature values inside an embryo E31 included in an image F61 is a random distribution as a whole. From this, it can be understood that movements in the embryo E31 are unsynchronized and a characteristic movement is not seen.

On the other hand, referring to FIG. 18, in the fourth example, a spatial distribution of movement feature values inside an embryo E32 (an embryo which is the same as the embryo E31, of which an image is captured at a point in time after an image capture time point of the image F61) is a distribution in which the movement feature values are respectively clustered laterally. From this, it is possible to determine that the cytoplasm is to be divided laterally inside the embryo E32, that is, cell division occurs.

In this way, by presenting spatial distributions of movement feature values relating to the inside of an embryo, it is possible to capture a spatial change of the movement feature values, in addition to a successive change of the movement feature values. Accordingly, it is possible to perform two-dimensional evaluation with respect to the quality of the embryo, and thus, it is possible to determine the quality of the embryo with high accuracy.

(Presentation of Orientation of Movement)

Further, in each of the examples shown in FIGS. 11 to 18, a spatial distribution of movement feature values relating to the inside of an embryo is superimposed and presented with overlap an image including the embryo, but the presentation of the spatial distribution of the movement feature values is not limited to the above-described examples. For example, the presentation control unit 206 may present an orientation of an internal movement of an embryo.

FIGS. 19 and 20 are diagrams showing a first example and a second example of a presentation relating to an orientation of an internal movement of an embryo. The first example is an example of a case in which there is no characteristic in the internal movement of the embryo, and the second example is an example in which the cytoplasm inside the embryo is being divided laterally.

Referring to FIG. 19, an image F71 includes an embryo E4, and plots of a spatial distribution of movement feature values relating to the inside of the embryo, which are present inside the embryo E4 in a superimposed manner. The presentation control unit 206 may present a graph indicating an orientation of an internal movement of an embryo on the basis of such a spatial distribution. Specifically, the presentation control unit 206 may perform a statistical process with respect to a movement amount and a movement direction of a movement in each plot, and may present a graph indicating the magnitude of a movement component corresponding to each direction in a radar pattern, among the internal movements of the embryo. For example, as shown in FIG. 19, the presentation control unit 206 may generate and present a graph 1201 indicating an orientation of an internal movement of an embryo using a movement amount and a movement direction of a movement in each plot. The graph 1201 shows that the size of a movement component in each direction is approximately uniform over the whole circumference. Accordingly, by the presentation of the graph 1201, it is possible to determine that there is no characteristic in the internal movement of the embryo.

On the other hand, referring to FIG. 20, an image F72 includes an embryo E5 of which the inside is being divided, and plots of a spatial distribution of movement feature values relating to the inside of the embryo, which are present inside the embryo E5 in a superimposed manner. In this case, the presentation control unit 206 may generate and present a graph 1211 indicating an orientation of an internal movement of an embryo. Then, the graph 1211 shows that the magnitudes of movement components in two opposite directions become remarkable. Accordingly, by the presentation of the graph 1211, it is possible to determine that the inside of the embryo is continuously divided since the internal movement of the embryo is mainly performed in two opposite directions.

In this way, by presenting an orientation of an internal movement of an embryo, it is possible to quantitatively evaluate movements relating to the inside of the embryo, and thus, it is possible to evaluate the quality of the embryo with high accuracy. Further, FIGS. 19 and 20 show spatial distributions of movement feature values corresponding to orientation graphs, but the orientation graphs may not be necessarily presented along with the spatial distributions, and only the orientation graphs may be presented.

(Example of Presentation Aspect)

Next, an example of a presentation aspect of an interface which is presented and controlled in a display device by the presentation control unit 206 will be described with reference to FIGS. 21 and 22. The presentation control unit 206 may perform control for presenting a movement feature value and presenting an image relating to the movement feature value, for example, as an interface.

FIG. 21 is a diagram showing a first example of a presentation form in the presentation control unit 206 according to this embodiment. Referring to FIG. 21, a display screen Disp1 includes a graph 1301 indicating a temporal change of movement feature values, multiple images 1302 relating to an embryo, and multiple images 1303 in which a spatial distribution of the movement feature values is present in a superimposed manner. Note that the images 1302 and 1303 may be images obtained by trimming only a region including the embryo, in images generated by the image capture device 10.

The images 1302 and 1303 may be displayed at positions corresponding to image capture time points of the images. For example, on an upper side of plot points on the graph 1301 relating to the movement feature values, the images 1302 may be displayed in association therewith. Thus, it is possible to evaluate the quality of an embryo while matching a change of movement feature values and a change aspect of the embryo morphology during a culture period.

FIG. 22 is a diagram showing a second example of a presentation form in the presentation control unit 206 according to the embodiment. Referring to FIG. 22, a display screen Disp2 includes a select box 1351 and an image display box 1353, in addition to a graph 1301 indicating a temporal change of movement feature values.

The select box 1351 is a box for selecting an embryo which is an observation target or a movement feature value which is a presentation target. For example, if any one of "Embryo1, Embryo2, Embryo3, . . . " in the select box 1351 is selected ("Embryo1" is selected in FIG. 22), a graph indicating a temporal change of movement feature values relating to the inside of an embryo corresponding to the selected one is presented as the graph 1301, and an image of the embryo is presented in the image display box 1353. Further, if any one of "MC1, 2, . . . " in the select box 1351 is selected, a graph indicating a temporal change of the selected movement feature values (MC) is presented as the graph 1301.

The image display box 1353 is a box for displaying an image of an embryo (or a spatial distribution or the like of movement feature values relating to the inside of the embryo). For example, in the image display box 1353, an image Img1 corresponding to a time point indicated by a point 1352 selected by a cursor on the graph 1301, of an embryo selected by the select box 1351, may be displayed. Further, in a case in which the point 1352 slides on the graph 1301, in the image display box 1353, the display of the image Img1 may be changed according to a change of the time point indicated by the point 1352. Thus, it is possible to evaluate the quality of an embryo while matching a change of movement feature values and a change aspect of an internal movement of the embryo during a culture period.

Furthermore, the display screens Disp1 and Disp2 shown in FIGS. 21 and 22 are merely examples of aspects of presentations controlled by the presentation control unit 206, and this technique is not limited to the examples. For example, as an image displayed on such a display screen, an image of an embryo in which a set region-of-interest is visualized may be displayed. Further, on the graph 1301, a display indicating a period corresponding to each cell stage of the embryo may be added.

2.4. Effects

The configuration examples, the processing examples, and the presentation control examples of the information processing device 20 according to an embodiment of the present disclosure have been described. The information processing device 20 according to this embodiment specifies movements in a region-of-interest set in images including an embryo captured during periods corresponding to a plurality of cell stages, calculates movement feature values relating to the embryo on the basis of the specified movements, and controls a presentation of movement feature values obtained during periods corresponding to two or more cell stages among the plurality of cell stages to contribute to the evaluation of the quality of the embryo. With such a configuration, it is possible to capture a characteristic movement inside the embryo in the plurality of cell stages, which affects the quality of the embryo. Accordingly, it is possible to evaluate the quality of the embryo with high accuracy.

Further, the information processing device 20 according to this embodiment controls a presentation of movement feature values obtained at least during a period up to a 2-cell stage and/or at least during a period corresponding to a 4-cell stage and thereafter. Thus, it is possible to capture movements that is said to be caused by gene expression derived from an egg cell seen up to a 2-cell stage and gene expression derived from a sperm cell seen in a 4-cell stage and thereafter inside an embryo. Accordingly, it is possible to evaluate the quality of an embryo with high accuracy.

Further, the information processing device 20 according to this embodiment controls presentation of an analysis result with respect to a temporal change of movement feature values. Thus, it is possible to focus on a global change and a local change included in the temporal change of the movement feature values. It has been said that these changes are caused by the above-described gene expression, cell division, or the like. Accordingly, by capturing these changes, it is possible to evaluate the quality of an embryo with high accuracy.

Further, the information processing device 20 according to this embodiment controls a presentation of a spatial distribution of movement feature values. Thus, it is possible to capture a spatial change inside an embryo, in addition to a temporal change of the movement feature values. Accordingly, it is possible to evaluate the quality of an embryo with high accuracy.

The information processing device 20 according to this embodiment has been described above.

2.5. Modified Example (Evaluation Unit)

The information processing device 20 according to this embodiment controls a presentation of calculated movement feature values, but the present technique is not limited to such an example. An information processing device 20A according to a modified example of this embodiment further includes an evaluation unit that evaluates the quality of an embryo using movement feature values acquired during periods corresponding to at least two cell stages among a plurality of calculated cell stages. Hereinafter, this modified example will be described with reference to FIGS. 23 and 24.

FIG. 23 is a functional block diagram showing a functional configuration example of the information processing device 20A according to this modified example. As shown in FIG. 23, the information processing device 20A according to this modified example includes a control unit 200A, a communication unit 210, and a storage unit 220A. Further, the control unit 200A includes an evaluation unit 207, in addition to the functional configuration of the control unit 200 according to the above-described embodiment. In addition, the storage unit 220A includes an evaluation DB (database) 221. Since respective components other than the evaluation unit 207 and the evaluation DB 221 are the same as the respective components included in the information processing device 20 according to the above-described embodiment, description thereof will not be repeated. Note that the presentation control unit 206 may control a presentation of an evaluation result obtained by the evaluation result 207.

(Evaluation Unit and Evaluation DB) The evaluation unit 207 has a function of evaluating the quality of an embryo using calculated movement feature values. Specifically, the evaluation unit 207 evaluates the quality of the embryo using movement feature values acquired during periods corresponding to at least two cell stages among a plurality of cell stages.

For example, the evaluation unit 207 may analyze a temporal change of the movement feature values, and may evaluate the quality of the embryo on the basis of the analysis result obtained thereby. The analysis for the temporal change of the movement feature values may be the above-described frequency analysis, peak analysis, regression fitting, similarity degree determination, or the like. More specifically, the evaluation unit 207 may perform the evaluation by comparing a frequency, a peak value, or an inter-peak distance obtained by analyzing the temporal change of the movement feature values with a predetermined threshold value. Further, the evaluation unit 207 may perform the evaluation on the basis of the tendency of a curve obtained by performing regression fitting with respect to a graph that shows the temporal change of the movement feature values. In addition, the evaluation unit 207 may evaluate the quality of the embryo relating to the movement feature values, for example, on the basis of an evaluation result of most similar data among temporal changes of previous movement feature values. By using such a threshold value or the like, it is possible to perform the evaluation using quantitative indexes, as well as qualitative characteristics relating to a temporal change of movement feature values. That is, the accuracy of evaluation is enhanced.

The above-described quantitative indexes may be indexes, for example, indicating a temporal change of movement feature values, using a relative maximum value, a relative minimum value, a representative value such as a maximum value or a minimum value, a point in time when the representative value is shown in a predetermined cell stage. By using such indexes, it is possible to easily evaluate the quality of an embryo.

An example of evaluation of an embryo using quantitative indexes in the evaluation unit 207 will be described. FIG. 24 is a graph for illustrating an example of indexes used for evaluation of the quality of an embryo in the evaluation unit 207 according to the present modified example. A movement profile 1401 indicating a temporal change of movement feature values is shown in the graph of FIG. 24.

As shown in FIG. 24, for example, as the indexes used for evaluation of the quality of the embryo, the following indexes are used.

a: Relative maximum value of movement feature values before first cell division (relative maximum value of movement feature values at a point in time closest to a point in time at which a 1-cell stage shifts to a 2-cell stage, among relative maximum values, which is a portion indicated by a region 1402 in FIG. 24)

b: Minimum value of movement feature values in the 2-cell stage (portion indicated by a region 1403 in FIG. 24)

d: Minimum value of movement feature values in the 1-cell stage (portion indicated by a region 1404 in FIG. 24)

$T_a$: Point in time at which an embryo has reached "a", using a melting point in time of a frozen embryo as a starting point $T_b$: Point in time at which the embryo has reached "b", using the melting point in time of the frozen embryo as the starting point $T_{ab90}$: Point in time at which a movement feature value decreases by 90% of a difference between "a" and "b" with reference to "a", using the melting point in time of the frozen embryo as the starting point Further, the origin on a time axis of the movement profile 1401 shown in FIG. 24 represents a point in time at which image capturing of an embryo is started, and does not necessarily match the melting point in time of the frozen embryo. In this case, it is necessary to separately record the melting point in time of the frozen embryo.

Further, by using these indexes, it is possible to easily evaluate the quality of an embryo on the basis of a temporal change of movement feature values as shown in the following examples. Particularly, $T_b$ reflects a timing when gene expression derived from a non-fertilized egg is switched to gene expression derived from a fertilized egg, that is, reflects the timing of gene expression derived from a sperm cell. Such timing is referred to as embryonic genome activation (EGA). Further, since these parameters are all obtained by the end of the 2-cell stage, it is possible to evaluate an embryo in an early stage.

Furthermore, a value obtained using multiple indexes may be used as an index according to this modified example. Here, $T_b-T_a$ and $T_{ab90}-T_a$ reflect that gene expression derived from a non-fertilized egg (that is, derived from an egg cell) retains.

In addition, such indexes are not limited to the above-described example, and may be appropriately set according to the relationship between the tendency indicated by a temporal change obtained by accumulating and acquiring the temporal change of movement feature values and the quality of an embryo indicating the temporal change.

Next, an example of evaluation of the quality of an embryo using the above-described indexes will be described.

In this example, the quality of an embryo was evaluated using the information processing system 1 according to this embodiment including the evaluation unit 270 with respect to a frozen embryo. A culture result of the used frozen embryo is shown in Table 1.

TABLE 1

|  | Hatching | Blastocyte | Non-Blastocyte | Total |
| --- | --- | --- | --- | --- |
| Number | 27 | 19 | 25 | 71 |
| Ratio | 38.0% | 26.8% | 35.2% | 100.0% |

As shown in Table 1, the number of used frozen embryos was 71, and 27 frozen embryos among them (38%) reached a stage of hatching, 19 frozen embryos (26.8%) reached the blastocyst stage (Blastocyte), and 25 frozen embryos did not reach the blastocyst stage (Non-Blastocyte).

Images of cells of the frozen embryos were captured by the image capture device 10, fine internal movements of the frozen embryos were analyzed by the information processing device 20A using the generated captured images, and the quality of the embryos was evaluated. An image capture rate of the captured images was 5 fps, and time lapse image capturing was performed at intervals of 15 minutes to 30 minutes to thereby generate the captured images. The information processing device 20A specified internal movements of the frozen embryos with respect to the captured images, and calculated movement feature values. Such movement feature values were obtained by performing space-time average on internal movement amounts of the frozen embryos. The information processing device 20A acquired a movement profile 1401 as shown in FIG. 24 using a temporal change of movement feature values obtained by plotting the movement feature values on a graph over time on a graph until the 4-cell stages of the embryos start.

Further, the evaluation unit 207 extracted the above-described indexes of a, b, d, $T_a$, $T_b$, and $T_{ab90}$ from the movement profile, compared the indexes with predetermined threshold values, determined high quality embryos on the basis of the comparison results, and evaluated a prediction rate of the high quality embryos. The prediction rate of the high quality embryos includes a prediction rate of hatching of the embryos, and a prediction rate of the embryos that form the blastocysts. In addition, the sensitivity in such an evaluation was calculated.

Combinations of indexes which are evaluation conditions and determination conditions of the high quality embryo are shown in Table 2. Condition 1 uses $T_a$, $T_{ab90}$-$T_a$, and $T_b$-$T_a$ as the indexes. Condition 2 uses a-b as an index, in addition to the indexes used in Condition 1. Condition 3 uses a-d as an index, in addition to the indexes used in Condition 2.

TABLE 2

| Index | $T_a$ (hr) | $T_{ab90}$-$T_a$ (hr) | $T_b$-$T_a$ (hr) | a-b (μm/s) | a-d (μm/s) |
|---|---|---|---|---|---|
| Condition 1 | <15 hr | 5 hr< | <24 hr | — | — |
| Condition 2 | <15 hr | 5 hr< | <24 hr | 0.03< | — |
| Condition 3 | <15 hr | 5 hr< | <24 hr | 0.03< | 0.015< |

Evaluation results of the quality or the like of the embryo are shown in Table 3 to Table 5. Table 3 to Table 5 show determination results of high quality embryos determined in Conditions 1 to 3 and prediction rates of high quality embryos, and sensitivities thereof. Here, the "Hatching+Blastocyte" means an embryo that forms the blastocyst.

TABLE 3

| (Condition 1) | | | | |
|---|---|---|---|---|
| | Hatching | Blastocyte | Non-Blastocyte | Total |
| Determined | 22 | 7 | 2 | 31 |
| Undetermined | 5 | 12 | 23 | 40 |
| | Hatching | | Hatching + Blastocyte | |
| Prediction rate | 71.0% | | 93.5% | |
| Sensitivity | 81.5% | | 63.0% | |

TABLE 4

| (Condition 2) | | | | |
|---|---|---|---|---|
| | Hatching | Blastocyte | Non-Blastocyte | Total |
| Determined | 19 | 5 | 2 | 26 |
| Undetermined | 8 | 14 | 23 | 45 |
| | Hatching | | Hatching + Blastocyte | |
| Prediction rate | 73.1% | | 92.3% | |
| Sensitivity | 70.4% | | 52.2% | |

TABLE 5

| (Condition 3) | | | | |
|---|---|---|---|---|
| | Hatching | Blastocyte | Non-Blastocyte | Total |
| Determined | 15 | 4 | 1 | 20 |
| Undetermined | 12 | 15 | 24 | 51 |
| | Hatching | | Hatching + Blastocyte | |
| Prediction rate | 75.0% | | 95.0% | |
| Sensitivity | 55.6% | | 41.3% | |

As shown in Table 3, the prediction rate of hatching of embryos was 71.0% in Condition 1, 73.1% in Condition 2, and 75.0% in Condition 3. Since an actual embryo hatching rate is 38.0%, it can be understood that the accuracy of selection of embryos for which hatching using such indexes is predicted is sufficiently high.

Further, the prediction rate of embryos that formed the blastocyst was 93.5% in Condition 1, 92.3% in Condition 2, and 95.0% in condition 3. Since the embryos that formed the blastocyst account for 66.2% of the total, it can be understood that the accuracy of selection of high quality embryos using such indexes is high. Accordingly, it can be understood that it is possible to predict high quality embryos at the end of the 2-cell stage is terminated with a high probability using such an evaluation method. That is, it can be understood that it is possible to evaluate the quality of an embryo with high accuracy. In addition, it can be understood that it is possible to enhance the prediction rate by increasing the number of indexes used for evaluation while the sensitivity is lowered to some extent.

One example of evaluation of the quality of an embryo using the above-described indexes has been described above. Further, the content disclosed in such an example does not limit content of the technique according to the present disclosure, and is merely an example.

Further, the evaluation unit 207 may evaluate the quality of an embryo using a learned model with respect to the relationship between a previous evaluation result of the quality of an embryo and movement feature values relating to the inside of the embryo, which is acquired in advance. This model is a model constructed by machine learning an evaluation result of the quality of an embryo which is previously cultured and a temporal change of movement feature values relating to the inside of the embryo. The machine learning may be machine learning using a neural network such as deep learning, for example. The constructed model may be stored in the evaluation DB 211.

By using such a model, it is possible to perform evaluation based on capturing of a characteristic oscillation or change of a temporal change of movement feature values for distinguishing the quality of an embryo, in addition to simple comparison with previous data. Accordingly, the evaluation accuracy is enhanced.

Hence, the information processing device 20 according to the modified example has been described.

3. HARDWARE CONFIGURATION EXAMPLE

Next, with reference to FIG. 25, a hardware configuration of an information processing device according to an embodiment of the present disclosure is described. FIG. 25 is a block diagram showing a hardware configuration example of the information processing device according to the embodiment of the present disclosure. An illustrated information processing device 900 can realize the information processing device 20 in the above described embodiment.

The information processing device 900 includes CPU 901, ROM 903, and RAM 905. In addition, the information processing device 900 may include a host bus 907, a bridge 909, an external bus 911, an interface 913, an input device 915, an output device 917, a storage device 919, a drive 921, a connection port 925, and a communication device 929. The information processing device 900 may include a processing circuit such as a digital signal processor (DSP) or an application-specific integrated circuit (ASIC), instead of or in addition to the CPU 901.

The CPU 901 functions as an arithmetic processing device and a control device, and controls the overall operation or a part of the operation of the information processing device 900 according to various programs recorded in the ROM 903, the RAM 905, the storage device 919, or a removable recording medium 923. For example, the CPU 901 controls overall operations of respective function units included in the information processing device 20 of the above-described embodiment. The ROM 903 stores programs, operation parameters, and the like used by the CPU 901. The RAM 905 transiently stores programs used when the CPU 901 is executed, and parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may be a remote control device that uses, for example, infrared radiation and another type of radio waves. Alternatively, the input device 915 may be an external connection device 927 such as a mobile phone that corresponds to an operation of the information processing device 900. The input device 915 includes an input control circuit that generates input signals on the basis of information which is input by a user to output the generated input signals to the CPU 901. The user inputs various types of data and indicates a processing operation to the information processing device 900 by operating the input device 915.

The output device 917 includes a device that can visually or audibly report acquired information to a user. The output device 917 may be, for example, a display device such as a LCD, a PDP, and an OELD, an audio output device such as a speaker and a headphone, and a printer. The output device 917 outputs a result obtained through a process performed by the information processing device 900, in the form of text or video such as an image, or sounds such as audio sounds.

The storage device 919 is a device for data storage that is an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores therein the programs and various data executed by the CPU 901, and various data acquired from an outside.

The drive 921 is a reader/writer for the removable recording medium 923 such as a magnetic disk, an optical disc, a magneto-optical disk, and a semiconductor memory, and built in or externally attached to the information processing device 900. The drive 921 reads out information recorded on the mounted removable recording medium 923, and outputs the information to the RAM 905. The drive 921 writes the record into the mounted removable recording medium 923.

The connection port 925 is a port used to directly connect devices to the information processing device 900. The connection port 925 may be a Universal Serial Bus (USB) port, an IEEE1394 port, or a Small Computer System Interface (SCSI) port, for example. The connection port 925 may also be an RS-232C port, an optical audio terminal, a High-Definition Multimedia Interface (HDMI (registered trademark)) port, and so on. The connection of the external connection device 927 to the connection port 925 makes it possible to exchange various kinds of data between the information processing device 900 and the external connection device 927.

The communication device 929 is a communication interface including, for example, a communication device for connection to a communication network NW. The communication device 929 may be, for example, a wired or wireless local area network (LAN), Bluetooth (registered trademark), or a communication card for a wireless USB (WUSB). The communication device 929 may also be, for example, a router for optical communication, a router for asymmetric digital subscriber line (ADSL), or a modem for various types of communication. For example, the communication device 929 transmits and receives signals in the Internet or transits signals to and receives signals from another communication device by using a predetermined protocol such as TCP/IP. The communication network NW to which the communication device 929 connects is a network established through wired or wireless connection. The communication network NW is, for example, the Internet, a home LAN, infrared communication, radio wave communication, or satellite communication.

Note that the CPU 901, the ROM 903, the RAM 905, and the like may realize the functions of the control unit 200 according to the above-described embodiment. Further, the storage device 919 may realize the functions of the storage unit 220 according to the above-described embodiment. In addition, at least one of the connection port 925 or the communication device 929 may realize the functions of the communication unit 210 according to the above-described embodiment.

The example of the hardware configuration of the information processing device 900 has been introduced.

4. CONCLUSION

It should be understood by those skilled in the art that various modifications, combinations, sub-combinations and alterations may occur depending on design requirements and other factors insofar as they are within the scope of the appended claims or the equivalents thereof.

For example, although the information processing system 1 is configured to be provided with the imaging device 10 and information processing device 20 in the above-described embodiment, the present technology is not limited thereto. For example, the imaging device 10 may have the function of the information processing device 20 (for example, an analysis process, a feature value calculation process, and a presentation control process). In this case, the information processing system 1 is realized by the imaging device 10. In addition, the information processing device 20 may have the function of the imaging device 10 (imaging function). In this case, the information processing system 1 is realized by the information processing device 20. Further, the imaging device 10 may have a part of the function of the information processing device 20, and the information processing device 20 may have a part of the function of the imaging device 10.

Further, the information processing system 1 according to the above-described embodiment has been described as a technique for IVF, but the present technique is not limited to such an example. For example, an embryo which is an observation target is not limited to an embryo of a human, and may be an embryo of a mammal such as a mouse, an embryo of an animal other than a mammal, an embryo of a multicellular organism other than an animal.

In addition, the evaluation DB 221 is stored in the storage unit 220A according to the modified example, and the evaluation DB 221 may be stored in an information processing device (for example, a cloud server) or the like other than the information processing device 20A. In this case, the information processing device 20A may acquire the evaluation DB 221 from the information processing device other than the information processing device 20A through the communication unit 210. As the evaluation DB 221 is provided in a shared server such as a cloud server, it is possible for a plurality of users to share a model stored in the evaluation DB 221, and to use data accumulated by the plurality of users for construction of the model.

Note that the steps in the processes performed by the information processing device in the present specification may not necessarily be processed chronologically in the orders described in the flowcharts. For example, the steps in the processes performed by the information processing device may be processed in different orders from the orders described in the flowcharts or may be processed in parallel.

Also, a computer program causing hardware such as the CPU, the ROM, and the RAM included in the information processing device to carry out the equivalent functions as the above-described configuration of the information processing device can be generated. Also, a computer readable storage medium having the computer program stored therein can be provided.

In addition, the effects described in the present specification are merely illustrative and demonstrative, and not limitative. In other words, the technology according to embodiments of the present disclosure can exhibit other effects that are evident to those skilled in the art along with or instead of the effects based on the present specification.

Additionally, the present technology may also be configured as below.

(1)
An embryonic development analysis device, comprising:
circuitry configured to:
determine, for each image of a plurality of embryonic development images captured in a time series depicting a plurality of cell stages, a region-of-interest corresponding to an inside portion of an embryo in the image;
analyze the plurality of embryonic development images to detect, for each image, a movement within the region-of-interest and a movement of the entire embryo; and
control output of at least one movement feature value based on a motion-compensated movement within the region-of-interest for images acquired during a period corresponding to at least two cell stages among the plurality of cell stages, wherein the motion-compensated movement is determined based, at least in part, on the detected movement of the entire embryo and the detected movement within the region-of-interest.

(2)
The information processing device according to (1), wherein the circuitry is further configured to control output of the at least one movement feature value for images acquired at least during a period from an initial cell stage up to a 2-cell stage.

(3)
The information processing device according to (1) or (2), wherein the circuitry is further configured to control output of the at least one movement feature value for images acquired at least during a period from a 4-cell stage to a later cell stage.

(4)
The information processing device according to any one of (1) to (3), wherein the circuitry is further configured to control output of an analysis result of a temporal change of the at least one movement feature value.

(5)
The information processing device according to any one of (1) to (4), wherein the at least one movement feature value includes a movement feature value based on a movement amount within the region-of-interest.

(6)
The information processing device according to any one of (1) to (5), wherein the at least one movement feature value includes a movement feature value based on a movement direction within the region-of-interest.

(7)
The information processing device according to any one of (1) to (6), wherein the at least one movement feature value includes a movement feature value based on a movement region within the region-of-interest.

(8)
The information processing device according to any one of (1) to (7), wherein the circuitry is further configured to control output of a spatial distribution of the at least one movement feature value in the region-of-interest.

(9)
The information processing device according to (8), wherein the spatial distribution of the at least one movement feature value includes a distribution of the at least one movement feature value based on movement amounts within the region-of-interest.

(10)
The information processing device according to (8) or (9), wherein the spatial distribution of the at least one movement feature value includes a distribution of the at least one movement feature value based on movement directions within the region-of-interest.

(11)
The information processing device according to any one of (8) to (10), wherein the circuitry is further configured to control output of an orientation of an internal movement of the embryo using the spatial distribution of the at least one movement feature value.

(12)
The information processing device according to any one of (1) to (11), wherein the circuitry is further configured to control output of the at least one movement feature value along with an image relating to the at least one movement feature value.

(13)
The information processing device according to any one of (1) to (12), wherein the circuitry is further configured to: evaluate a quality of the embryo using the at least one movement feature value acquired during a period from at least two cell stages among the plurality of cell stages.

(14)
The information processing device according to (13), wherein evaluating a quality of the embryo comprises evaluating the quality of the embryo based on a temporal change of the at least one movement feature value.

(15)
The information processing device according to (13) or (14), wherein evaluating a quality of the embryo comprises evaluating the quality of the embryo using a model trained with respect to a relationship between a previous evaluation result of the quality of the embryo acquired in advance and the at least one movement feature value.

(16)
The information processing device according to any one of (13) to (15), wherein the evaluating a quality of the embryo comprises evaluating the quality of the embryo on the basis of a representative value of the at least one movement feature value in a predetermined cell stage and a point in time at which the representative value is shown.

(17)
The information processing device according to any one of (1) to (16), wherein the circuitry is further configured to: determine the motion-compensated movement within the region-of-interest by performing, for each image of the plurality of images, motion compensation based, at least in part, on the detected movement of the entire embryo and the detected movement within the region-of-interest.

(18)
The information processing device according to any one of (1) to (17), wherein the plurality of embryonic development images correspond to a moving image obtained by image capturing for a predetermined time at a predetermined cycle.

(19)
An embryonic development analysis method, the method comprising:
determining, for each image of a plurality of embryonic development images captured in a time series depicting a plurality of cell stages, a region-of-interest corresponding to an inside portion of an embryo in the image;
analyzing the plurality of embryonic development images to detect, for each image, a movement within the region-of interest and a movement of the entire embryo; and controlling output of at least one movement feature value based on a motion-compensated movement within the region-of-interest for images acquired during a period corresponding to at least two cell stages among the plurality of cell stages, wherein the motion-compensated movement is determined based, at least in part, on the detected movement of the entire embryo and the detected movement within the region-of-interest.

(20)
An embryonic development analysis system, comprising:
an image capture device including:
an image capture unit configured to capture a plurality of embryonic development images in a time series depicting a plurality of cell stages; and circuitry configured to:
determine, for each image of a plurality of embryonic development images, a region-of-interest corresponding to an inside portion of an embryo in the image; analyze the plurality of embryonic development images to detect, for each image, a movement within the region-of interest and a movement of the entire embryo; and control output of at least one movement feature value based on a motion-compensated movement within the region-of-interest for images acquired during a period corresponding to at least two cell stages among the plurality of cell stages, wherein the motion-compensated movement is determined based, at least in part, on the detected movement of the entire embryo and the detected movement of the entire embryo.

REFERENCE SIGNS LIST 1 information processing system
10 imaging device
20 information processing device
101 image capture unit
102 image capture control unit
200 control unit
201 image acquisition unit
202 region-of-interest setting unit
203 analysis unit
204 movement compensation unit
205 feature value calculation unit
206 presentation control unit
207 evaluation unit
210 communication unit
220 storage unit
221 evaluation DB

The invention claimed is:
1. An embryonic development analysis device, comprising:
circuitry configured to:
determine, for each image of a plurality of embryonic development images captured in a time series depicting a plurality of cell stages, a region-of-interest corresponding to an inside portion of an embryo in the image;
analyze the plurality of embryonic development images to detect, for each image, a movement within the region-of-interest and a movement of the entire embryo; and
determine, for each image of a plurality of embryonic development images, a region-of-interest corresponding to an inside portion of an embryo in the image;
analyze the plurality of embryonic development images to detect, a movement of the entire embryo;
perform, on at least some of the plurality of embryonic development images, motion compensation based on the detected movement of the entire embryo to generate motion compensated images;
analyze the motion compensated images to detect, a movement within the region-of-interest; and
control output of at least one movement feature value based on the detected movement within the region-of- interest for images acquired during a period corresponding to at least two cell stages among the plurality of cell stages.

2. The information processing device according to claim 1,
wherein the circuitry is further configured to control output of the at least one movement feature value for images acquired at least during a period from an initial cell stage up to a 2-cell stage.

3. The information processing device according to claim 1,
wherein the circuitry is further configured to control output of the at least one movement feature value for images acquired at least during a period from a 4-cell stage to a later cell stage.

4. The information processing device according to claim 1,
wherein the circuitry is further configured to control output of an analysis result of a temporal change of the at least one movement feature value.

5. The information processing device according to claim 1,
wherein the at least one movement feature value includes a movement feature value based on a movement amount within the region-of-interest.

6. The information processing device according to claim 1,
wherein the at least one movement feature value includes a movement feature value based on a movement direction within the region-of-interest.

7. The information processing device according to claim 1,
wherein the at least one movement feature value includes a movement feature value based on a movement region within the region-of-interest.

8. The information processing device according to claim 1,
wherein the circuitry is further configured to control output of a spatial distribution of the at least one movement feature value in the region-of-interest.

9. The information processing device according to claim 1,
wherein the circuitry is further configured to control output of the at least one movement feature value along with an image relating to the at least one movement feature value.

10. The information processing device according to claim 1, wherein the circuitry is further configured to:
evaluate a quality of the embryo using the at least one movement feature value acquired during a period from at least two cell stages among the plurality of cell stages.

11. The information processing device according to claim 1, wherein the circuitry is further configured to:
determine the motion-compensated movement within the region-of-interest by performing, for each image of the plurality of images, motion compensation based, at least in part, on the detected movement of the entire embryo and the detected movement within the region-of-interest.

12. The information processing device according to claim 1,
wherein the plurality of embryonic development images correspond to a moving image obtained by image capturing for a predetermined time at a predetermined cycle.

13. The information processing device according to claim 8,
wherein the spatial distribution of the at least one movement feature value includes a distribution of the at least one movement feature value based on movement amounts within the region-of-interest.

14. The information processing device according to claim 8,
wherein the spatial distribution of the at least one movement feature value includes a distribution of the at least one movement feature value based on movement directions within the region-of-interest.

15. The information processing device according to claim 8,
wherein the circuitry is further configured to control output of an orientation of an internal movement of the embryo using the spatial distribution of the at least one movement feature value.

16. The information processing device according to claim 10,
wherein evaluating a quality of the embryo comprises evaluating the quality of the embryo based on a temporal change of the at least one movement feature value.

17. The information processing device according to claim 10,
wherein evaluating a quality of the embryo comprises evaluating the quality of the embryo using a model trained with respect to a relationship between a previous evaluation result of the quality of the embryo acquired in advance and the at least one movement feature value.

18. The information processing device according to claim 10,
wherein the evaluating a quality of the embryo comprises evaluating the quality of the embryo on the basis of a representative value of the at least one movement feature value in a predetermined cell stage and a point in time at which the representative value is shown.

19. An embryonic development analysis method, the method comprising:
determining, for each image of a plurality of embryonic development images captured in a time series depicting a plurality of cell stages, a region-of-interest corresponding to an inside portion of an embryo in the image;
analyzing the plurality of embryonic development images to detect a movement of the entire embryo;
performing, on at least some of the plurality of embryonic development images, motion compensation based on the detected movement of the entire embryo to generate motion compensated images;
analyzing the motion compensated images to detect, a movement within the region-of-interest; and
controlling output of at least one movement feature value based on the detected movement within the region-of-interest for images acquired during a period corresponding to at least two cell stages among the plurality of cell stages.

20. An embryonic development analysis system, comprising:
an image capture device including:
an image capture unit configured to capture a plurality of embryonic development images in a time series depicting a plurality of cell stages; and
circuitry configured to:

determine, for each image of a plurality of embryonic development images, a region-of-interest corresponding to an inside portion of an embryo in the image;
analyze the plurality of embryonic development images to detect, for each image, a movement within the region of interest and a movement of the entire embryo;
perform, on at least some of the plurality of embryonic development images, motion compensation based on the detected movement of the entire embryo to generate motion compensated images;
analyze the motion compensated images to detect, a movement within the region-of-interest; and
control output of at least one movement feature value based on the detected movement within the region-of-interest for images acquired during a period corresponding to at least two cell stages among the plurality of cell stages.

* * * * *